United States Patent
Sokoler et al.

(10) Patent No.: US 6,320,496 B1
(45) Date of Patent: Nov. 20, 2001

(54) SYSTEMS AND METHODS PROVIDING TACTILE GUIDANCE USING SENSORY SUPPLEMENTATION

(75) Inventors: Tomas Sokoler, Roskilde (DK); Lester D. Nelson, Santa Clara; Elin R Pedersen, Redwood City, both of CA (US)

(73) Assignees: Fuji Xerox Co., LTD, Tokyo (JP); Xerox Corporation, Stamford, CT (US)

( * ) Notice: Subject to any disclaimer, the term of this patent is extended or adjusted under 35 U.S.C. 154(b) by 0 days.

(21) Appl. No.: 09/301,594

(22) Filed: Apr. 29, 1999

(51) Int. Cl.[7] .................................................. H04B 3/36
(52) U.S. Cl. .................. 340/407.1; 340/825.36; 340/825.4; 381/315; 434/112
(58) Field of Search ............... 340/407.1, 407.2, 340/539, 286.14, 524, 525, 825.36, 825.49; 381/315; 434/112

(56) References Cited

U.S. PATENT DOCUMENTS

| | | | |
|---|---|---|---|
| 3,736,551 | 5/1973 | Hirsch | 367/134 |
| 3,902,687 | 9/1975 | Hightower | 244/185 |
| 4,044,350 | 8/1977 | Tretiakoff et al. | 340/407.2 |
| 4,191,945 | 3/1980 | Hannen et al. | 340/407.2 |
| 4,194,190 | 3/1980 | Bareau | 340/407.2 |
| 4,215,490 | 8/1980 | Fewell | 434/114 |
| 4,473,356 | 9/1984 | Fernando et al. | 434/114 |
| 4,586,904 | 5/1986 | Chlumsky | 434/114 |
| 4,871,992 | 10/1989 | Petersen | 304/407.1 |
| 5,144,294 | * 9/1992 | Alonzi et al. | 340/825.49 |

(List continued on next page.)

OTHER PUBLICATIONS

MoBIC Discussion Document, "Standard Interface for Orientation and Navigation Systems for Disabled Persons", Jun. 1995, pp. 1–17.

(List continued on next page.)

Primary Examiner—Daryl Pope
(74) Attorney, Agent, or Firm—Oliff & Berridge, PLC

(57) ABSTRACT

A tactile guidance system and method provides a user with navigational assistance through continuous background communication. This continuous background communication is realized through tactile cueing. By making the direction giving through tactile cues, a user's main attention can focus on visual and auditory cues in the real world, instead of focusing on the direction giving device itself. An electronic compass maintains the orientation of a user. A navigation state is maintained as a combination of orientation, location and destination. A guidance server provides a mapping from a user's current location to directions to a desired destination. Communication links maintain communication between the tactile direction device and the guidance server. The compass, tactile direction device, communication links and guidance server all interact to provide direction information to a user via a tactile surface. The tactile direction device is small enough to be hand-held or incorporated, for example, into a briefcase handle.

69 Claims, 17 Drawing Sheets

U.S. PATENT DOCUMENTS

| | | | |
|---|---|---|---|
| 5,508,699 | * 4/1996 | Silverman | 340/944 |
| 5,616,901 | 4/1997 | Crandall | 235/379 |
| 5,623,358 | 4/1997 | Madey | 359/172 |
| 5,627,547 | 5/1997 | Ramaswamy et al. | 342/357.08 |
| 5,638,060 | 6/1997 | Kataoka et al. | 341/20 |
| 5,685,721 | 11/1997 | Decker | 434/114 |
| 5,774,828 | 6/1998 | Brunts et al. | 701/210 |
| 5,939,981 | * 8/1999 | Renney | 340/539 |

OTHER PUBLICATIONS

Probert, P., et al. "Interfaces for Multi–Sensor Systems for Navigation for the Blind", Proceedings of the $1^{st}$ European Conference on Disability, Virtual Reality and Assoc. Tech., Maidenhead, U.K., 1996.

Tan, H., et al. "Tactile Displays for Wearable Computing," Massachusetts Institute of Technology Media Laboratory Perceptual Computing Section Technical Report No. 431, Proceedings of the International Symposium on Wearable Computers, 1997, pp. 1–6.

Crandall, William, et al. "Transit Accessibility Improvement through Talking Signs® Remote Infrared Signage: A Demonstration and Evaluation,:" http://www.ski.org/RERC/Wcrandall/FINAL.HTML, downloaded Jan. 25, 1999, pp. 1–18.

Irvine, Duncan. "Talking Beacons," Possum Controls Ltd., http://www.robots.ox.ac.uk:5000/~pjp/Rank/Irvine.html, downloaded Jan. 29, 1999, p. 1.

Talkenberg, Herwarth. "Electronic Guide Dog: A Technical Approach on In–Town Navigation," Avionik Zentrum Brauschweig, http://www.robots.ox.ac.uk:5000/~pjp/Rank/talkenberg.html, downloaded Jan. 29, 1999, pp. 1–2.

Loomis, J.M., et al. "Personal Guidance System for the Visually Impaired," *Assets '94*, Proceedings of the First Annual ACM Conference on Assistive Technologies, http://www.acm.org/pubs/citations/proceedings/assets/ 191028/p85–loom., downloaded Jan. 29, 1999, p. 1.

Tyson, Peter. "High–Tech Help for the Blind," http://www.techreview.com/articles/apr95/TrendsBlind.html, downloaded Jan. 29, 1999, pp. 1–3.

"Parallax Products," http://www.prarllaxinc.com/products/products.html, downloaded Jan. 29, 1999, pp. 1–2.

Precision Navigation Profile Page, http://www.precision-navigation.com/profilpage.html, downloaded Jan. 29, 1999, 11 pp.

Meijer, Peter B. L. "An Experimental System for Auditory Image Representations," Philips Research Laboratories, Endhoven, The Netherlands, http://ourworld.compuserve.com/homepages/Peter_Meijer/voicebme.html, downloaded Jan. 29, 1999, 21 pp.

"Corporate Profile: About Linx," http://www.linxtechnologies.com/m_prof.html, downloaded Jan. 29, 1999, pp. 1–5.

"Atlas Speaks," Arkenstone, http://arkenstone.org/atlas.htm, downloaded Jan. 25, 1999, pp. 1–3.

"Status of GPS Navigation for Blind Users," Arkenstone, http://arkenstone.org/gps.htm, downloaded Jan. 29, 1999, 5 pp.

* cited by examiner

| LOCATION | 1 | 2 | 3 | 4 | 5 |
|---|---|---|---|---|---|
| 1 | ● | s | s | s | s |
| 2 | n | ● | e | e | e |
| 3 | s | s | ● | s | e |
| 4 | w | w | n | ● | n |
| 5 | w | w | w | w | ● |

FIG.8

SYSTEMS AND METHODS PROVIDING TACTILE GUIDANCE USING SENSORY SUPPLEMENTATION

BACKGROUND OF THE INVENTION

1. Field of Invention

This invention is related to navigational assistance systems. In particular, this invention is directed to systems and methods which provide tactile guidance through sensory supplementation.

2. Description of Related Art

A plethora of directional guidance systems are available with differing degrees of accuracy and scalability. For example, U.S. Pat. No. 3,902,687 to Hightower discloses a seat cushion for the pilot of an aircraft. The seat cushion has left and right vibrators that indicate to the pilot the deviation from a course selected via a radio navigation aid receiver. If the pilot is off course, one of the vibrators is actuated for indicating the corrective action needed, while the frequency of vibration indicates the error magnitude. This system can be further expanded by slipping an attachment over the pilot's leg. This attachment would again have vibrators to indicate deviations, for example, from a predetermined glide slope.

U.S. Pat. No. 3,736,651 to Hirsch discloses a pad which is mounted on the back of a swimmer. Embedded in the pad are indicators arranged in perpendicular rows. Upon sequentially energizing an indicator in a selected row, the person, i.e., swimmer, receives commands corresponding to a particular direction they should swim. H. Tan et al., "Tactile Displays for Wearable Computing," Massachusetts Institute of Technology Media Laboratory Perceptual Computing Section Technical Report No. 431, Proceedings of the International Symposium on Wearable Computers, 1997, discloses a wearable device for providing directions cues. Specifically, the system is designed to stimulate the back of a user. This system provides direction cues in the form of geometric patterns generated by sequentially energizing cells in a 3×3 vibrator array.

P. Probert et al., "Interfaces for Multi-Sensor Systems for Navigation for the Blind," Proceedings of the 1$^{st}$ European Conference on Disability, Virtual Reality and Assoc. Tech., Maidenhead, U.K., 1996 discloses wearable vibrating belts presented as part of a multi-modal navigation system for the blind. The wearable belt contains three sonar sensors for range finding of nearby objects and micro-navigation. Vibro-tactile cues are provided to the user via three vibrating motors in the belt. Thus, the belt is designed for use as a close range obstacle detection/avoidance device for the blind.

Additionally, there are many devices for forming a tactile readable message, including Braille characters and other various forms of graphic objects, such as lines and two-dimensional shapes formed by a matrix of pins. See, for example, U.S. Pat. No. 4,194,190 to Bareau and U.S. Pat. No. 4,473,356 to Fernando. Other generic actuating mechanisms include solenoids, as described in U.S. Pat. No. 4,191,945 to Hannen, electromagnetic devices, disclosed in U.S. Pat. No. 4,586,904 to Chlumsky and U.S. Pat. No. 4,871,992 to Peterson, piezoelectric devices, disclosed in U.S. Pat. No. 4,044,350 to Tretiakoff, and shape memory alloy actuators, disclosed in U.S. Pat. No. 5,685,721 to Decker.

Other methods for providing direction cueing use the Global Positioning Service (GPS). Mapless GPS systems, such as those described in U.S. Pat. No. 5,627,547 to Ramaswamy and U.S. Pat. No. 5,774,828 to Brunts, provide visual and audio direction cues to give directions to a user in outdoor environments.

Systems for overcoming disabilities are designed around substituting one sense for another. Arkenstone and VisuAide have jointly developed two new computer-based orientation systems for people with visual impairments. The first orientation system, ATLAS SPEAKS, enables maps to be accessible to blind people via voice synthesis or Braille displays. Users choose locations by address, by intersection, or by virtually "walking" there. Using detailed digital street maps, the user pilots a virtual pedestrian on the street network of the desired area. As the user explores the map, a talking user interface provides complete speech access to the system. This system also provides the ability to customize maps by adding points of personal interest or to choose paths between desired points. The system also allows the user to save the directions for such a path to, for example, a tape recorder, a note taker or printed hard copy.

The second orientation system is STRIDER. The STRIDER system integrates a GPS receiver with the digital map database from ATLAS SPEAKS. By combining and adding this capability to a portable notebook computer, a user gains access to information about their current location and the layout of the immediate area. Therefore, these systems provide orientation cues based on digital map data and satellite positioning information. Similar systems, such as "User Interface Designed for a Travel Aid for Blind People," http://www.psyc.nott.ac.uk/bmru/archive.html, 1995, by F. Michael, were developed in Europe.

L. Golledge, "Personal Guidance System for the Visually Impaired," Assets '94, Proceedings of the First Annual ACM Conference on Assistive Technologies, pp. 85–91, discloses a computer-based navigation system for the blind. This system consists of modules for determining a user's position and orientation, providing a computer map of the surrounding environment and a user interface built around a virtual acoustic display. For example, to indicate to a user that the administration building is off to the user's left, the user will hear the words "administration building" coming from their left.

H. Talkenberg, "The Electronic Guide Dog: A Technical Approach to In-Town Navigation," http://www.robots.ox.ac.uk:5000/~pjp/Rank/talkenberg.html, Avionik Zentrum Braunschweig GMBH & Co., KG Rebenring, Germany, March 1996, provides autonomous obstacle detection as the basic mobility function. Continuous position determination is included in the system for help functions, such as, for example, an automatic ambulance call. A mobile phone is built into the system for speech and data communication. This system further comprises a positioning system, a close range sensor, the mobile phone interface and a central station with a human operator who provides taxi calls, gives directions, etc. A button located on the user's system activates transmission of the position data to the central station. The operator can then identify, on a monitor collocated with the operator, the user's location by means of an electronic map. If necessary, instructions may be given directly to the user or an execution of a required service can be confirmed by a return signal to the user.

P. D. L. Meijer, "An Experimental System for Auditory Image Representations," IEEE Transactions on Biomedical Engineering, Vol. 39, No. 2, pp. 112–121, February 1992, discloses the vOICe system, which provides auditory displays that are intended as a substitute for vision. Image-tosound mapping is used to generate the artificial vision. Specifically, the system was designed to provide auditory image representations within some of the known limitations of the human hearing system, possibly as a step towards the development of a vision substitution device for the blind. The application of an invertible one-to-one image-to-sound mapping ensures the preservation of the visual information.

TALKING SIGNS, disclosed in part in U.S. Pat. No. 5,616,901 to Crandall, and U.S. Pat. No. 5,623,358 to Madey, provide remote infra-red signs allowing people who are either print disabled or sight-impaired to know not only where a sign is located, but also the content of the sign. Specifically, unlike Braille, where raised letters or voice signs passively label some location or give instructions to some destination, TALKING SIGNS provides a repeating, directionally selective voice message which originates at the sign and is transmitted by infra-red light to a hand-held receiver carried by the user.

Similarly, the OPEN system disclosed in D. Irvin, "Talking Beacons," Possom Controls Ltd., http://www.robots.ox.ac.uk:5000/~pjp/Rank/irvine.html, is based on an infra-red transmission of speech. A network of infra-red beacons assist navigation through an underground station. Beacons are located at decision points, for example, where a side tunnel splits off from a main tunnel. The user is able to deduce the direction of the beacon from the characteristic of the received signal. Thus, the ability to be oriented to the beacon facilitates navigation across open spaces, and identifies the locations of key points, such as a ticket office. The users of the infra-red OPEN receivers are required to listen to the speech messages. The speech messages are continuously transmitted from the infra-red beacons. The OPEN receiver is normally silent, but plays a speech message to the user when an infra-red beam is within range of the receiver.

SUMMARY OF THE INVENTION

Existing interfaces, such as the Global Positioning System map displays, require a user to focus on the direction finding device. By requiring such high levels of attention, existing navigation technology attempts to interfere with a person's natural intuitive navigational abilities, and sometimes also interferes with possibly more urgent activities the person may be involved in. In reality, the success of a navigational tool relies on a fine balance between supporting the navigational needs of the user, and not overwhelming the user's intuitive wayfinding abilities, or any other possibly more urgent activities the user may be involved in. For example, a common scenario in which other activities are essential is navigation while driving a car. Recent systems provide a map display to the driver, risking that the user will divert the user's attention away from traffic and focus on the map display. Likewise, audible direction cueing requires a user to continuously pay close attention to avoid missing an audio cue. Furthermore, continuous or frequently given audible cues can be distracting, and a user can become desensitized to them to such an extent that the cues are missed.

Many tasks in everyday life rely on the simple assumption that a person is able to find his or her way from one location to another. Most people recognize the unpleasant and highly frustrating feeling when this assumption breaks down and they become lost. The methods and systems of this invention are designed to accommodate needs for navigational aid in complex environments such as large office buildings, shopping malls, airports, hospitals, parking garages, museums and the like. The methods and systems of this invention are also designed to work in general environments such as those currently serviced by GPS. Such general environments include outdoor locations. The methods and systems of this invention focus on the notion of directional guidance through stimulating a person's peripheral perception.

Existing technologies tend to organize navigational tasks in ways which tend to capture the entire focal range of the selected senses, thereby substituting the use of the navigational system for the person's natural senses. The methods and systems of this invention are a supplement to, or an enhancement of, a person's natural ability to navigate, rather than a substitute for any one or more senses. Consequently, the methods and systems of this invention provide directional guidance via subtle tactile cues to ensure that the user's main attention is on the visual and auditory cues of the real world, not the navigational cues of the device.

The systems and methods of this invention provide navigational assistance through continuous background communication.

This invention separately provides systems and methods for assisting users with navigation.

This invention separately provides systems and methods that allow a user to interact with a navigational aid via a tactile direction device.

This invention separately provides systems and methods that allow navigation as a non-focal activity.

The methods and systems of this invention maintain the navigational state of a user by means of an electronic compass. The tactile guidance systems and methods of this invention rely on background communication through tactile cueing to aid a user with navigation. The tactile cueing is based on a current heading, a current location and a desired destination. By providing this information to the guidance server, the guidance server can calculate the direction needed to arrive either at the desired destination or some intermediary destination.

Upon receiving the directional indication from the guidance server for the current direction the user needs to travel in to reach the desired destination, the tactile direction device determines, based on the current heading of the user, the necessary tactile cueing to indicate to the user which direction to proceed in.

In one exemplary embodiment, a location server provides a mapping from the user's location to a desired location. Communication links maintain communication between a tactile direction device held by the user and the guidance server.

Specifically, in this exemplary embodiment, a tactile direction device accompanies the user. The tactile direction device forwards location and destination information to a guidance server. The guidance server returns to the tactile direction device directional cues corresponding to the direction needed to reach the desired destination. The tactile direction device then activates a tactile surface indicating to the user which direction to proceed in.

The tactile guidance systems and methods according to this invention off-load activities from the user's already over-taxed cognitive system to under-utilized areas, such as the peripheral ranges of the user's senses. The tactile guidance systems and methods according to this invention enable the user to navigate a complex environment while having to dedicate very little attention to manipulating any type of user device. The tactile guidance systems and methods according to this invention capitalize on an under-utilized portion of human perception and enable a larger degree of lowintentional interaction that is not found in current guidance and navigation systems. The tactile guidance systems and methods of this invention also recognize a direct physical action can be more efficient and reliable than interactions with a display device. For example, receiving a nudge which makes a user turn left is far more easily recognized and responded to than having the same user read a display of, for example, a global positioning system which indicates the user should come to a heading of, for example, 274°.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures wherein:

FIG. 8 illustrates an exemplary embodiment of a look-up table for determining direction information;

DETAILED DESCRIPTION OF PREFERRED EMBODIMENTS

Operation of the tactile guidance systems and methods according to this invention reduce the amount of attention required for a user to dedicate to a navigational aid, while allowing full and immediate navigational assistance. A user, upon entering a new environment, initializes a tactile direction device. After inputting a desired destination, the tactile direction device, communicating with a location beacon network and a guidance server, determines a heading in which the user must proceed to reach the desired destination. The tactile direction device, upon receiving directional information from the guidance server, activates a tactile surface that indicates to a user the direction to which the user must turn and, the direction in which the user must proceed in order to reach the desired destination.

Specifically, when navigating between and looking for real-world locations, it is essential that the user's focus of attention is on the actual physical environment rather than on the navigational aid. The tactile guidance systems and methods of this invention are designed to supplement a person's natural ability to navigate in the real world, rather than act as a substitute for those abilities. Most people only need occasional subtle confirmations indicating that they are proceeding in the right direction, or warnings alerting them that they are proceeding in the wrong direction.

For example, when knowing that the overall direction of a route to be taken to a certain destination is "straight ahead," people are fully capable of adjusting to small turns and obstacles without bumping into other people or obstacles. Furthermore, people only need a low level of directional assistance to proceed to the right destination. Unlike robotic behavior, people will not normally bang their heads against the walls in an attempt to go straight through the wall, but will combine the directional guidance from the tactile guidance system with their natural navigational abilities and experiences from navigating in the real world.

By stimulating a surface of the tactile direction device, low-level directional aids can be relayed to a user. Since these directional aids require little to no focal activity, and could be processed as background or peripheral information, users can dedicate their full attention to the surrounding environment.

Figure 1:
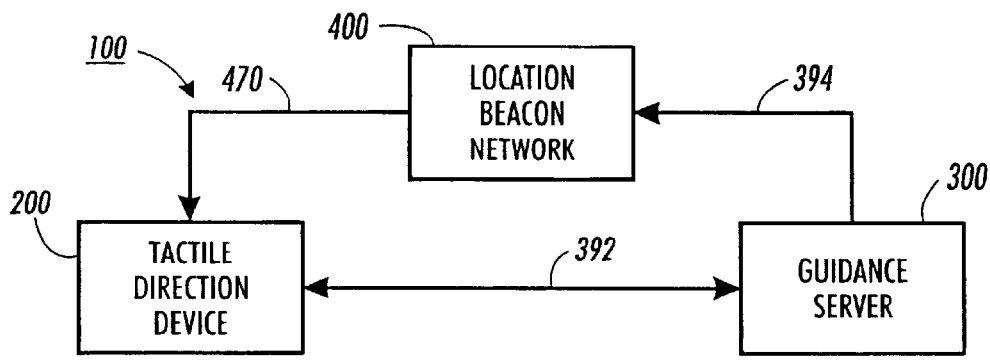
FIG. 1 is a functional block diagram showing a first exemplary embodiment of the tactile guidance system according to this invention.

FIG. 1 illustrates a tactile guidance system 100 according to this invention. Specifically, the tactile guidance system 100 comprises a tactile direction device 200, a guidance server 300, a location beacon network 400, wireless links 392 and 470, and an optional wired or wireless link 394.

The tactile direction device 200 receives a desired destination input from the user or an outside source, as well as a current location input over the wireless link 470 from a location beacon 405 of the location beacon network 400. The tactile direction device 200 forwards the current location information and the desired destination information to the guidance server 300 over the link 392. The guidance server 300 determines the direction in which the tactile direction device 200, i.e., the user, should proceed to arrive at the desired destination. Upon making this determination, the guidance server 300 transmits back to the tactile direction device 200, over the wireless link 392, the current location, the desired destination and direction information. The tactile direction device 200, upon receiving this direction information, determines the current heading of the tactile display device 200 and generates a revised heading, relative to the current heading of the tactile display device 200. The revised heading is translated to point the user in the direction in which the user needs to proceed to eventually arrive at the desired destination. In particular, the tactile direction device 200 converts this direction cue to a control signal for a tactile surface. A tactile surface controller converts the control signal into a stimulus that can be sensed by the user.

The location beacon network 400 includes a series of location beacons 405, e.g., transmitters, where each location beacon 405 corresponds to a particular location within a navigable space. Each location beacon 405 within the location beacon network 400 transmits a signal corresponding to that particular location beacon's identifier. Whenever the tactile direction device 200 enters a space corresponding to a particular location beacon 405, the location beacon identifier will be used to inform the tactile direction device 200 of its current position. For example, the beacon location identifier may be provided to the tactile direction device 200 in a local coordinate system, such as, for example, a simple integer coordinate system for a building, or a building/column numbering system or the like, or expressed in a globally unique identifying format, such as, for example, a Universal Resource Locator, a GPS coordinate system, latitude or longitude, or the like.

The guidance server 300 is responsible for answering the received desired destination request from the tactile direction device 200. The guidance server 300, upon receiving the current location information and the desired destination information, determines, for example with reference to a look-up table, a direction to the next location to which the user needs to proceed in route to the final destination.

Figure 2:
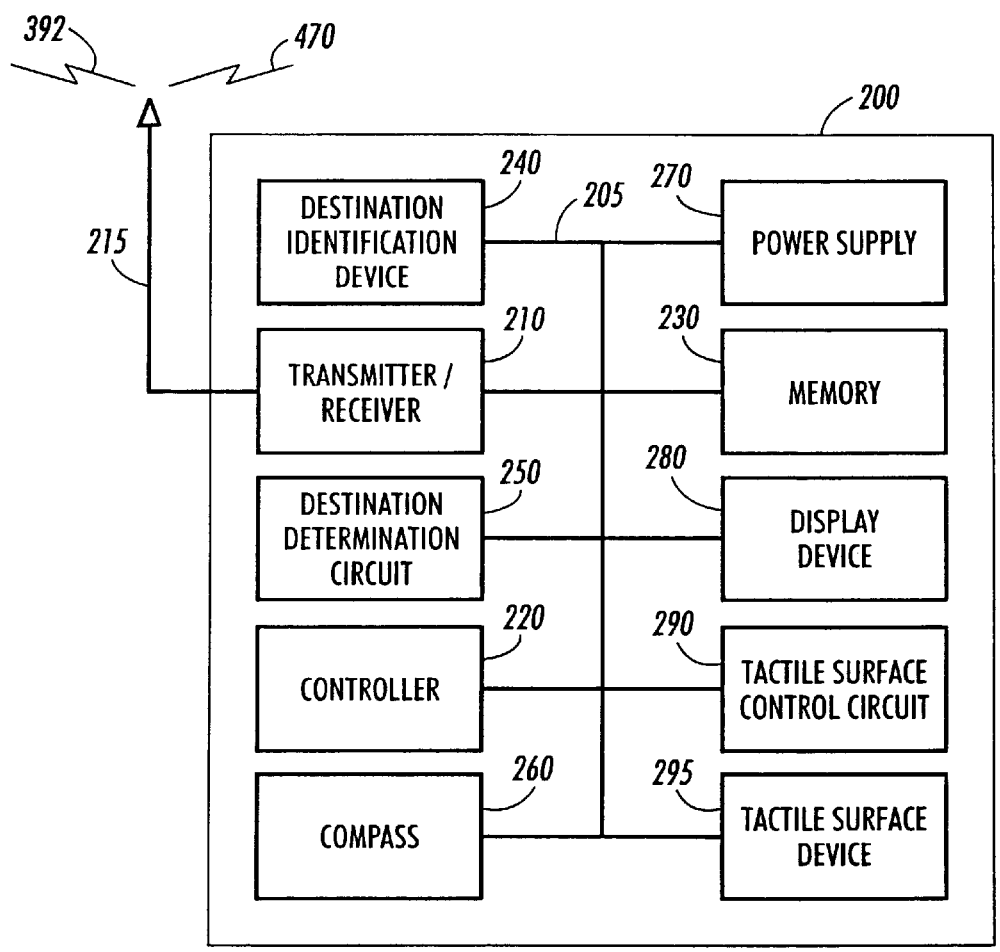
FIG. 2 shows a functional block diagram of one exemplary embodiment of the tactile direction device of this invention.

FIG. 2 illustrates the tactile direction device 200 in greater detail. Specifically, the tactile direction device 200 comprises transmitter/receiver 210, a controller 220, a memory 230, a destination identification device 240, a direction determination circuit 250, a compass 260, a power supply 270, a display device 280, a tactile surface control circuit 290, a tactile surface device 295, a control/data bus 205 and an antenna 215.

After initialization, where the tactile direction device 200 calibrates the compass 260 and establishes communication with a location beacon 405, in the location beacon network 400, and the guidance server 300, destination identification data is input to the destination identification device 240. This destination identification data corresponds to the desired destination of the user. The destination identification data can be input to the tactile direction device 200 in a plurality of ways.

For example, upon entering an office building for a meeting, a user could approach a reception area. Upon being greeted by the receptionist, the user can indicate that the user has a meeting in, for example, "Conference Room 4." Upon receiving this request, the receptionist could activate a transmitter that forwards destination identification data corresponding to "Conference Room 4" to the tactile direction device 200.

Alternatively, for example, upon entering a new environment, the user could proceed to a direction kiosk. This kiosk could, for example, show a map of the environment, such as, for example, an office building, that the user is in. Upon selecting the desired destination at the kiosk, the kiosk could transfer the destination identification data to the tactile direction device 200. Alternatively, the tactile direction device 200 could include an alphanumeric keypad for entering the destination identification data corresponding to the desired destination.

Upon receipt by the tactile direction device 200, the destination identification data is transferred via the antenna 215 and the transmitter/receiver 210 to the memory 230 at the direction of controller 220. The destination identification device 240 can then retrieve the destination identification data from memory 230 as needed.

Furthermore, since the tactile direction device 200 is capable of receiving and storing destination identification data, destination identification data can be transferred or shared between users. Thus, for example, if a user desires to meet a colleague for lunch at "The Deli," a first user could transmit the necessary desired destination identification data to a second user. This second user would activate the destination identification data for "The Deli" in the tactile direction device 200, which could then guide the second user from the second user's current location to "The Deli."

The destination identification device 240 also performs a conversion to provide the user with a recognizable mnemonic, e.g., "The Deli," corresponding to the destination identification data. Specifically, in addition to the destination identification data that is forwarded to the tactile direction device 200 corresponding to the desired destination, a human recognizable mnemonic corresponding to the destination identification data could also be forwarded to the tactile direction device 200. This mnemonic is displayed in the display device 280 so the user is aware of the currently selected destination.

The destination identification device 240 also functions as a "bookmark" type system for storing and retrieving, for example, frequently traveled-to destinations. Thus, a user, via an input device, such as the above-described direction kiosk or alphanumeric keypad, selects a desired destination, or alternatively, for example, activates the tactile direction device 200 to store a current location, such as, for example, where the user's car is parked in a garage equipped with location beacons 405. The user can then enter a mnemonic, such as, for example, "car", corresponding to the selected input. If the user for any reason needs to return to the user's car, the user simply selects the "car" mnemonic in the tactile direction device 200. The destination identification device 240 then converts the mnemonic into the coordinate system equivalent, and forwards this new destination identification data to the guidance server 300.

Upon receiving the destination identification data, the tactile direction device 200 detects its current location based on a signal received over the wireless link 470 from a location beacon 405 in the location beacon network 400. This current location information is received over the antenna 215 and the transmitter/receiver 210 and stored under control of the controller 220 in the memory 230 over the control/data bus 205. At the direction of the controller 220, the current location is retrieved from the memory 230. Furthermore, at the direction of the controller 220, the destination identification data corresponding to a desired destination is retrieved from the memory 230 and both the current location and desired destination are transmitted by the transmitter/receiver 210 and the antenna 215 over the wireless link 392 to the guidance server 300.

The guidance server 300 returns the current location information, the desired destination information and direction information to the tactile direction device 200. This data is received over the wireless link 392, the antenna 215 and the transmitter/receiver 2120 and stored in the memory 230. The direction determination circuit 250 then determines whether new floor information was included with the direction information returned from the guidance server 300. If new floor information was included, the direction determination circuit 250 retrieves the new floor information from the memory 230. Under the control of the controller 220, the new floor information is displayed on display device 280. This allows a user to recognize that the user must traverse to a new floor to reach the desired destination.

Alternatively, if no new floor information was received from the guidance server 300, or after the new floor information is displayed, the tactile direction device 200 obtains a current heading from the compass 260. Once a current compass heading is obtained from the compass 260, the direction determination circuit 250 retrieves from the memory 230 the direction information received from the guidance server 300 and determines a direction cue. The direction cue is then forwarded to the tactile surface control circuit 290, which activates at least one actuator in the tactile surface device 295. The actuator indicates to a user the direction in which to proceed to reach the desired destination.

Since the tactile direction device 200 is a transportable device, it comes with a self-contained power supply 270. The power supply 270 can be any known or later developed device capable of supplying sufficient power to run the tactile direction device 200 including, but not limited to, batteries, rechargeable batteries, solar power or the like.

Furthermore, the tactile display device 200 can be equipped with a speaker or other audio device or any other known or later developed device that is capable of generating an audible sound (not shown), that, at the direction of controller 220, emits a tone if new floor information is received. Using this audio signal further removes a cognitive load from the user, since the user would not need to check the display device 280 unless a tone was heard. Alternatively, the tactile surface device 295 could retract all of the pegs 275, raise all of the pegs 275, vibrate or use some unique state of the tactile surface device 295 to indicate new floor information is being displayed on the display device 280.

Figure 3:
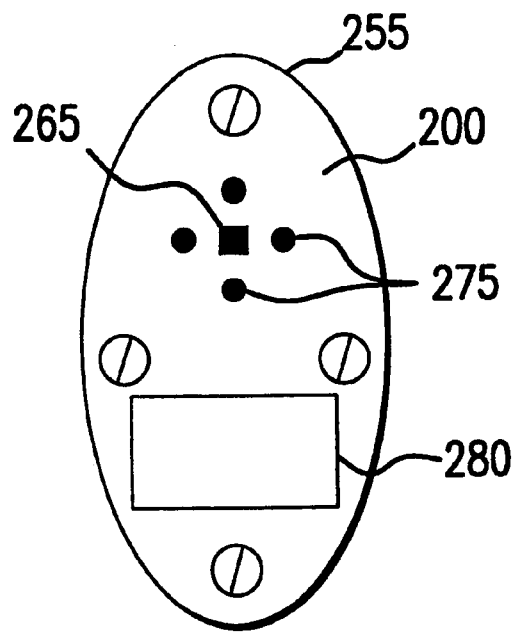
FIG. 3 shows one exemplary embodiment of the tactile surface device.

FIG. 3 shows an exemplary embodiment of the outside shell of the tactile direction device 200. In this exemplary embodiment of the outside shell, the tactile direction device 200 is hand-held and includes an outer surface 255, the display device 280 and the tactile surface device 295, which includes a reference peg 265 and a plurality of movable pegs 275. The tactile direction device 200 conveys the directional information to the user via the movable pegs 275. The movable pegs 275, at the direction of the tactile surface control circuit 290 and the tactile surface device 295, are raised and lowered to provide direction cues to the user.

FIG. 3 illustrates an exemplary arrangement of the movable pegs 275 and the reference peg 265 in which four direction cues, i.e., forward, backward, left and right, correspond to the four movable pegs 275. The center reference peg 265 provides a reference marker to assist the user in distinguishing which of the movable pegs 275 is raised. However, it should be understood the center reference peg 265 need only provide a different feel than the movable pegs 275 and need not extend as far above the device surface 255 as any of the movable pegs 275. Therefore, in this exemplary hand-held embodiment of the tactile direction device 200, a finger or thumb placed above the center reference point 265 and the movable pegs 275 could easily detect directional cues corresponding to the raising of one of the movable pegs 275 corresponding to a particular direction to be taken.

Furthermore, the distance the movable pegs are raised could correspond to the amount of distance to be traveled. Therefore, as the distance to the desired location, or some intermediary destination, is reduced, the movable pegs 275 can make a corresponding change in height.

As previously discussed, the desired destination of a user may be on a different floor than the current location. Thus, the display device 280 is capable of displaying mnemonic or new floor information to a user. For example, the display device 280 could be a liquid crystal display, a light emitting diode display, or the like. Furthermore, audible notification or tactile cueing could convey floor information to a user.

Figure 4:
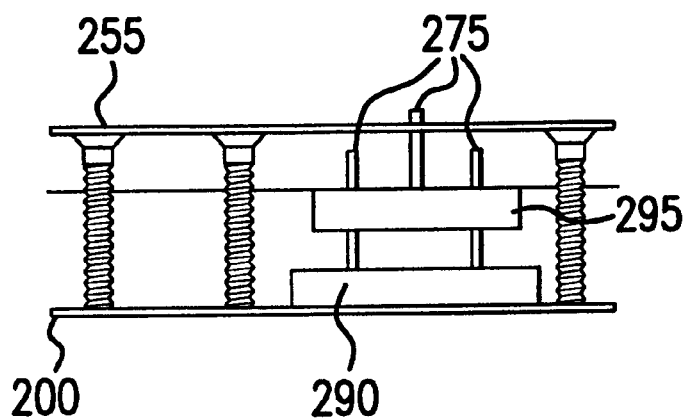
FIG. 4 shows a sectional view of the exemplary tactile direction device of FIG. 3

FIG. 4 shows a cross-sectional view of the tactile direction device 200 shown in FIG. 3. Specifically, the cross-sectional view illustrates how the movable pegs 275 protrude through the surface 255 to come in contact with for example, a user's thumb or finger. The tactile surface device 295 moves each of the movable pegs 275, for example, with a solenoid, at the direction of the tactile surface control circuit 290.

While the tactile direction device 200 has been described as a distinct hand-held device, it should be understood that the tactile direction device 200 can be incorporated into any structure where it is capable of conveying navigational information to a user. For example, the tactile direction device 200 can be incorporated into the arm of a wheel chair, a briefcase handle, the sole of a shoe, a pager, a cellular telephone, a PDA or other hand-held, palm-sized computer, a purse, a hat, a dedicated tactile direction device, or the like.

Figure 5:
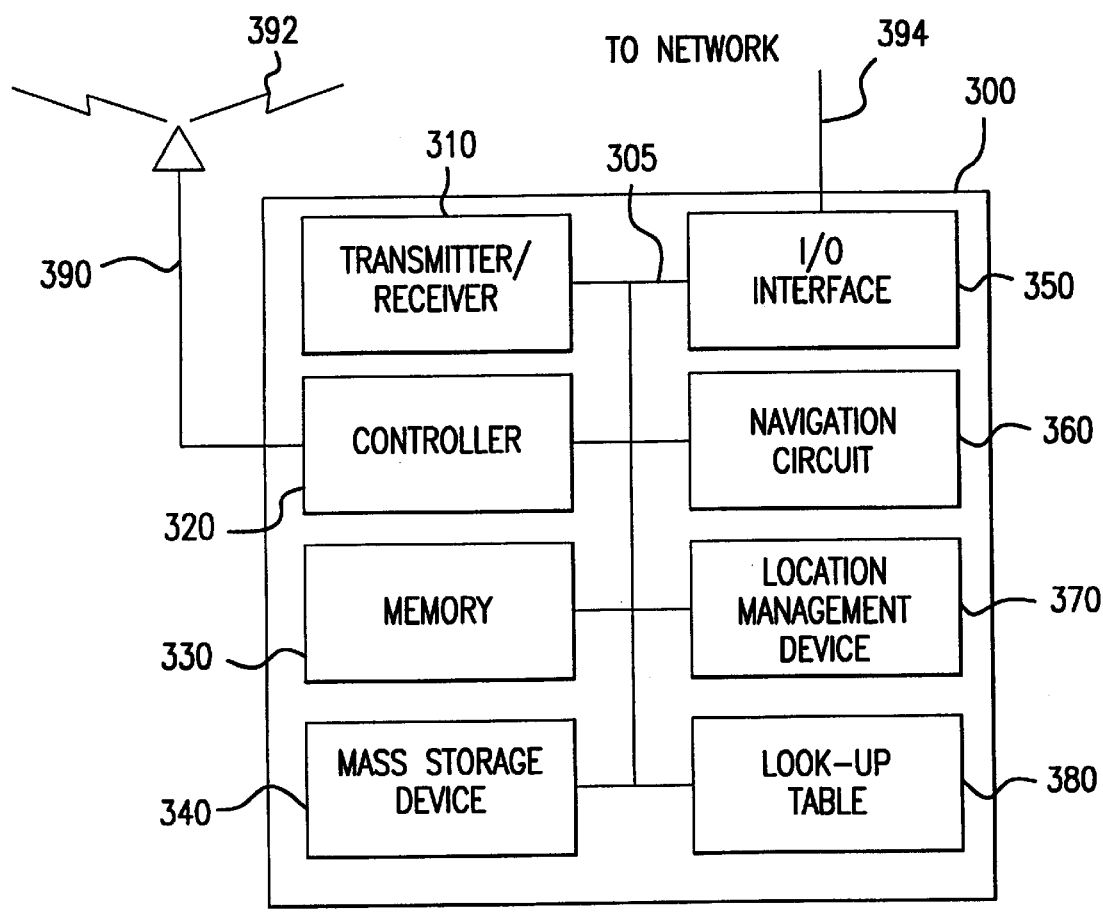
FIG. 5 shows a functional block diagram of one exemplary embodiment of the guidance server of this invention.

FIG. 5 is a functional block diagram of one exemplary embodiment of the guidance server 300. Specifically, the guidance server 300 comprises a transmitter/receiver 310, a controller 320, a memory 330, a mass storage device 340, an I/O interface 350, a navigation circuit 360, a location management device 370, a look-up table 380, a control/data bus 305, an antenna 390, and the optional wired or wireless link 394 to a network.

The guidance server 300 receives, over the wireless link 392, the antenna 390 and the transmitter/receiver 310, the current location and the desired destination information from the tactile direction device 200. The current location and the desired destination information are transferred under control of the controller 320 over the control/data bus 305 to the memory 330. Upon receiving the current location and the desired destination information, the location management device 370 determines whether the desired destination is on a different floor than the current location. If the desired destination is not on another floor, the navigation circuit 360, in cooperation with the look-up table 380 and the mass storage device 340, and at the direction of the controller 320, determines direction information identifying the next location beacon in route to the final destination. This direction information, along with the current location and the desired destination information, is then transmitted via the transmitter/receiver 310 and the antenna 390 over the wireless link 392 back to the tactile direction device 200. For example, with reference to the look-up table 380, the navigation circuit 360 can determine the direction needed to route the user to an interim destination that is in route to the final destination.

It should be appreciated that the determination of how to guide the user to another floor may also be based on predetermined criteria or, for example, a specific users' requirements. For example, when the user initially enters the desired destination information, for example, at the directory kiosk, the user could additionally enter information indicating they require wheelchair accessible corridors. Accordingly, the desired destination information could be accompanied by a flag indicating that only navigation through wheelchair accessible routes is acceptable.

Alternatively, if the desired destination is on a different floor than the current location, the location management device 370 generates a new floor flag. The new floor flag indicates to the navigation circuit 360 that instead of determining the direction information to the desired destination, the direction information for guiding a user to a stairwell or to an elevator used to move to the new floor is needed. Specifically, the navigation circuit 360 will generate direction information that could guide the user to, for example, the nearest elevator or stairwell. Therefore, if such predetermined criteria is present, for example, for wheelchair accessible routes, in the event a floor change is necessary, the navigation circuit 360 would automatically route the user to the appropriate elevator.

The guidance server 300 can contain an optional link 394. This optional link 394 can for example, connect a plurality of the guidance servers 300 in different areas of a large complex. For example, a plurality of guidance servers 300 could interface with other guidance serves 300 to enable a user to pass from, for example, one building to another. Additionally, the guidance server 300 could be connected to any one or more of the location beacons 405 in the location beacon network 400 via the optional link 394. However, this link 394 is merely optional, and the location beacons within the location beacon network 400 are able to operate without direct interaction with the guidance server 300.

Figure 6:
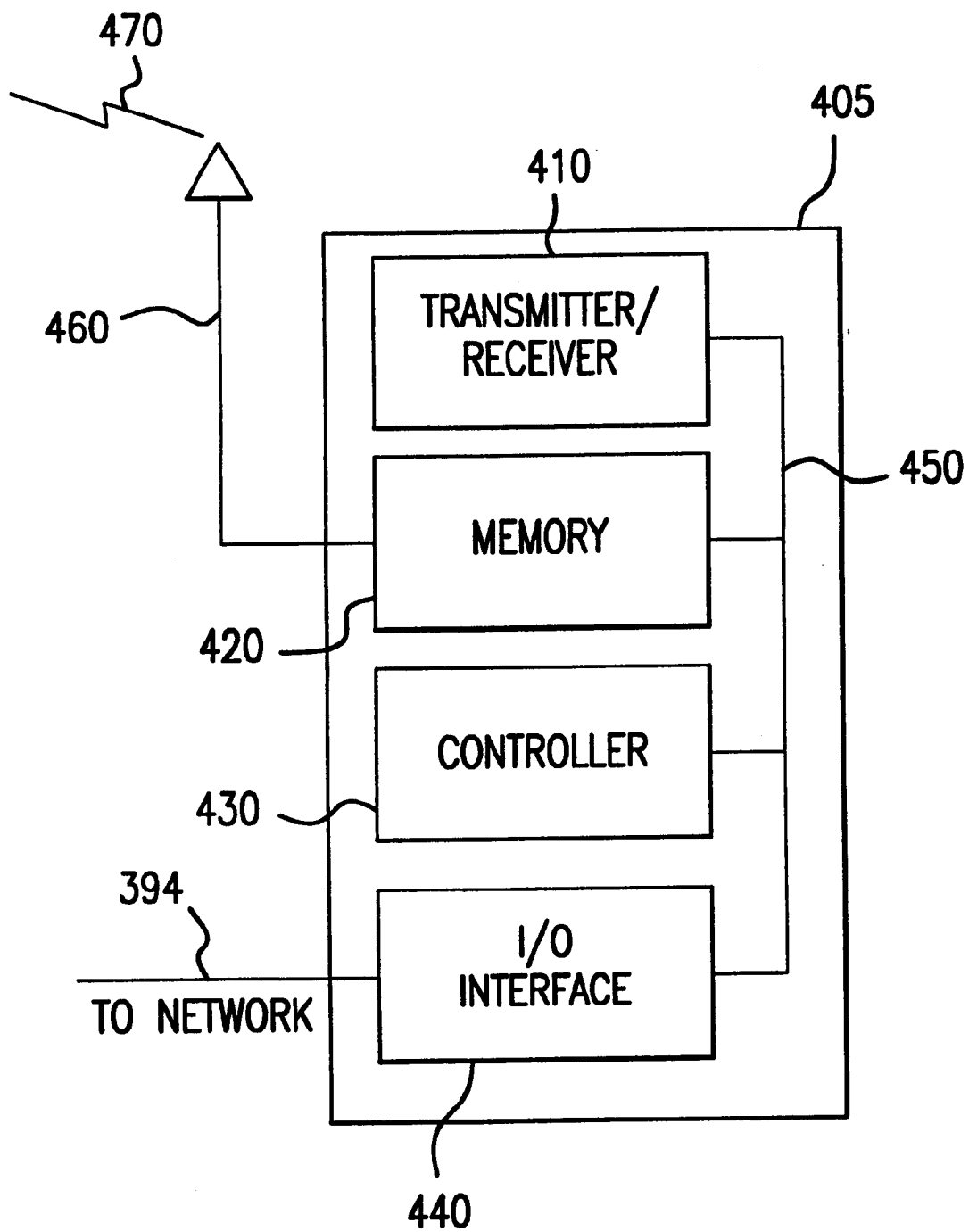
FIG. 6 shows a functional block diagram of one exemplary embodiment of a location beacon in the location beacon network of this invention.

FIG. 6 is an exemplary block diagram of an exemplary embodiment of one location beacon 405 within the location beacon network 400. In this exemplary embodiment, each location beacon 405 within the location beacon network 400 comprises a transmitter/receiver 410, a memory 420, a controller 430, an I/O interface 440, a control/data bus 450, an antenna 460 and the optional link 394.

Each location beacon 405 stores a location identifier in the memory 420 corresponding to that location beacon's location in an environment. A location identifier, at the direction of the controller 430, is continuously transmitted from the transmitter/receiver 410 and the antenna 460. The location beacon 405 also contains an I/O interface 440 which can be connected via the optional link 394 to other location beacons 405 within the location beacon network 400 or to the guidance server 300. It should be appreciated that the location beacon 405 can operate on a continuous basis, or be programmed to transmit the location identifier at some predetermined interval, as appropriate.

Figure 7:
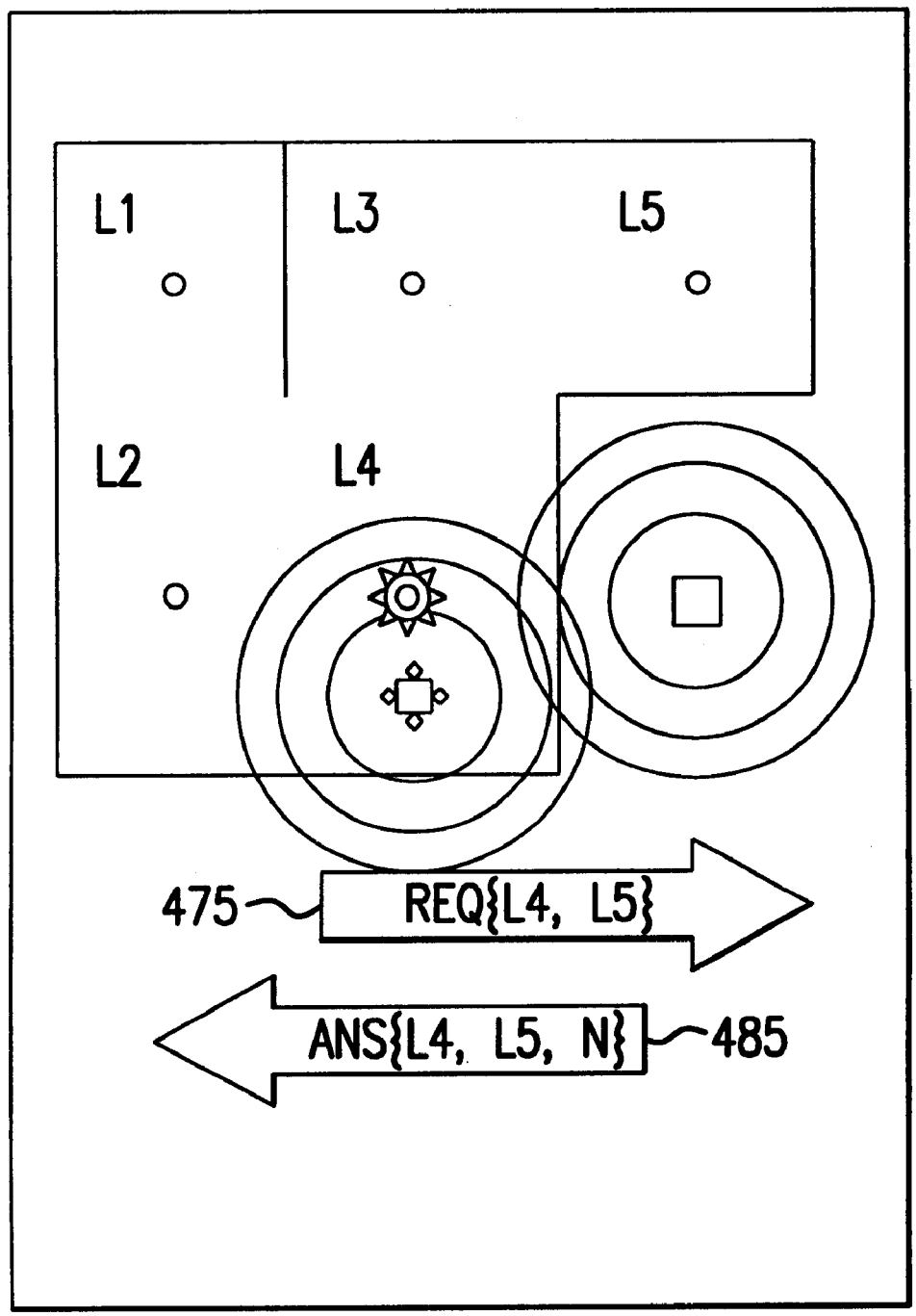
FIG. 7 illustrates how communication between the tactile direction device and the guidance server occurs.

FIG. 7 illustrates how communication between the tactile direction device 200 and the guidance server 300 occurs. Specifically, after the tactile direction device 200 has been initialized, the desired destination has been input and the current location has been detected, a request 475 is forwarded from the tactile direction device 200 to the guidance server 300 via the link 470. The request 475 contains the current location information and the desired destination information. The guidance server 300 receives this request, determines an appropriate course to the destination and returns an answer 485 to the tactile direction device 200. In one exemplary embodiment, the answer comprises the current location, the desired destination and the direction, with new floor information if appropriate, the user is to take to reach the next location in route to the final destination. Communication between the tactile direction device 200 and the guidance server 300 in this way has several advantages. Specifically, since the tactile direction device 200 does not contain a "tactile direction device identifier" the anonymity of the user operating any particular tactile direction device 200 can be preserved.

It would be obvious to one of ordinary skill in the art to modify the exact communication path over which the tactile direction device 200 and the guidance server communicate. For example, the request 475 and answer 485 need not be communicated directly between the tactile direction device 200 and the guidance server 300. A location beacon 405 can act as an intermediary "sub-station" which receives a request 475, and forwards the request over the optional link 394 to the guidance server 300. Additionally, as would be apparent to one of ordinary skill in the art, independent "sub-stations" or repeaters could be located throughout an environment as needed to ensure a clear communication path between the tactile direction device 200 and the guidance server 300.

Figure 8:
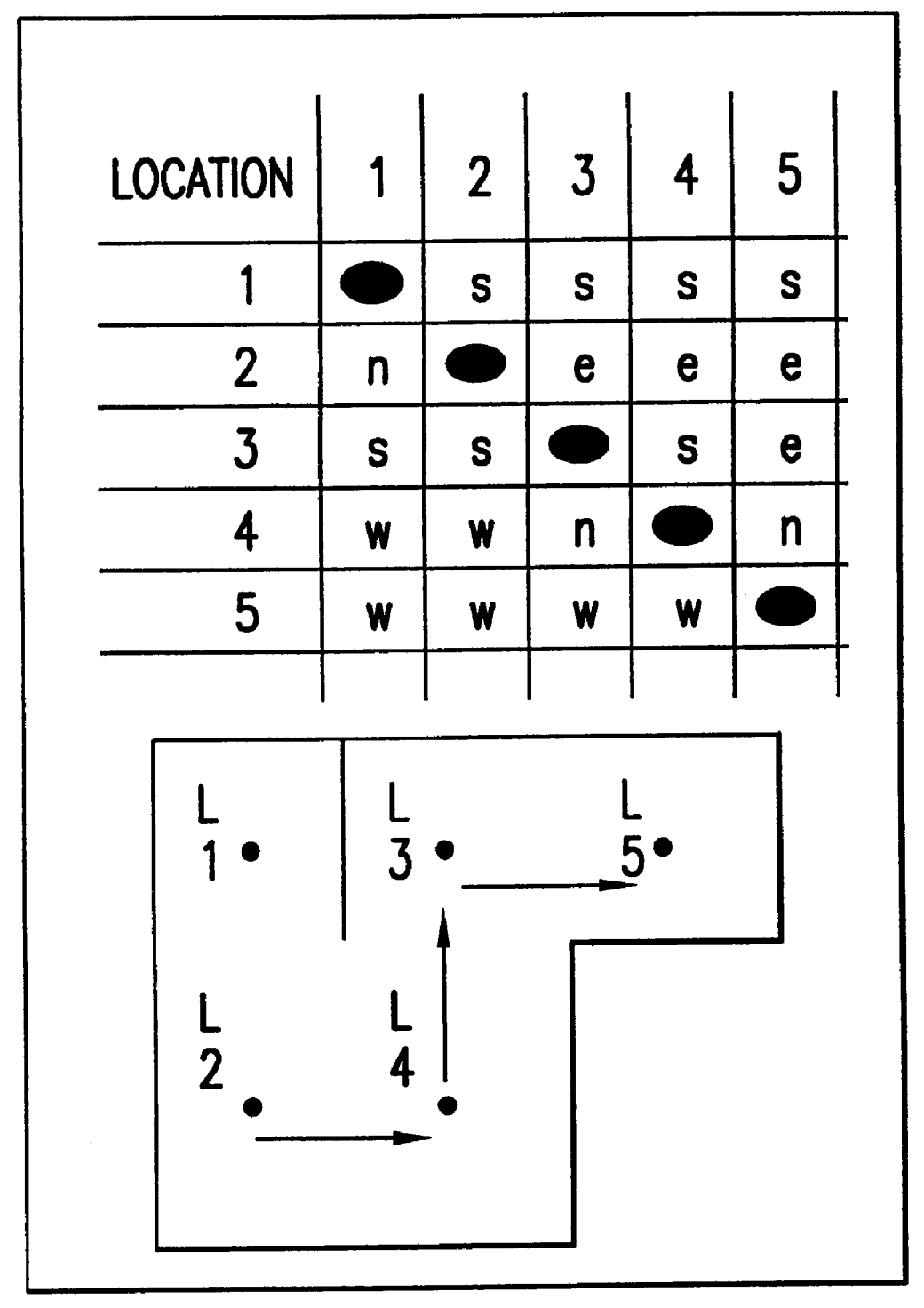

FIG. 8 illustrates how the guidance server 300 determines the route to be used to guide the user to a desired destination. Specifically, the guidance server 300 bases its direction determination on a look-up table. The look-up table contains a matrix of current locations and desired destinations as well as floor information, if applicable. The look-up table describes the topology of the environment supported by the guidance server 300. The matrix of the look-up table provides, for each location beacon 405 supported by a particular guidance server 300, the direction the user needs to take from that location beacon to reach any particular final destination. For example, if a user holding a tactile direction device 200 is around the location beacon 2, and needs to reach a desired destination around the location beacon 5, the look-up table will indicate that to proceed from the location beacon 2 to the desired destination location beacon 5, the user holding that tactile direction device 200 should go east towards the location beacon 4. From the location beacon 4, the user holding the tactile direction device 200 will be informed to go north towards the location beacon 3, and finally, once the user holding the tactile direction device arrives at the location beacon 3, the user will be notified to head east to the desired destination location beacon 5.

Figure 9:
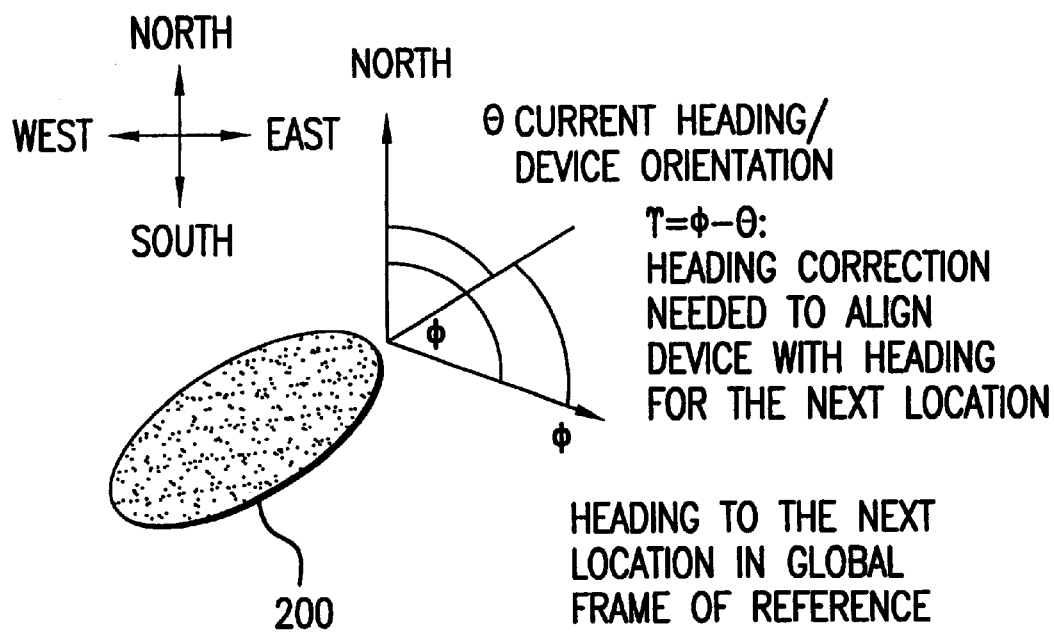
FIG. 9 illustrates how a directional cue is determined.

FIGS. 9–12 illustrate how to determine the navigational cues to be generated by the tactile direction device 200. Specifically, FIG. 9 shows a view from the tactile direction device's perspective of the current heading θ relative to a global frame of reference, such as magnetic north. Specifically, the compass 260 provides the tactile direction device 200 with information pertaining to the orientation of the tactile direction device 200 in a global frame of reference defined by the earth's magnetic field. The guidance server 300 provides, on a request from the tactile direction device 200, direction information giving the direction to the next location beacon 405 that should be visited on the route to the final destination. Combining the tactile direction device's orientation with the direction information received from the guidance server 300, a revised heading value can be found representing the relative change in orientation the tactile direction device 200 needs to take to point to the next location along the route to the final destination. For example, the tactile direction device 200 can retrieve the current heading θ. Upon receiving the direction φ to the next location beacon from the guidance server 300, the direction determination circuit 250 can determine any heading revision Ψ, i.e., change in orientation, that may be required as:

$$\Psi = \phi - \theta$$

where:
  φ is the heading direction to the next location beacon in the global frame of reference;
  θ is the current heading direction; and
  Ψ is the heading revision, or change in orientation, needed to align the tactile direction device with the heading φ to the next location beacon. Based on the heading revision, a direction cue for the tactile direction device 200, i.e., forward, left, right or back, is determined.

Figure 10:
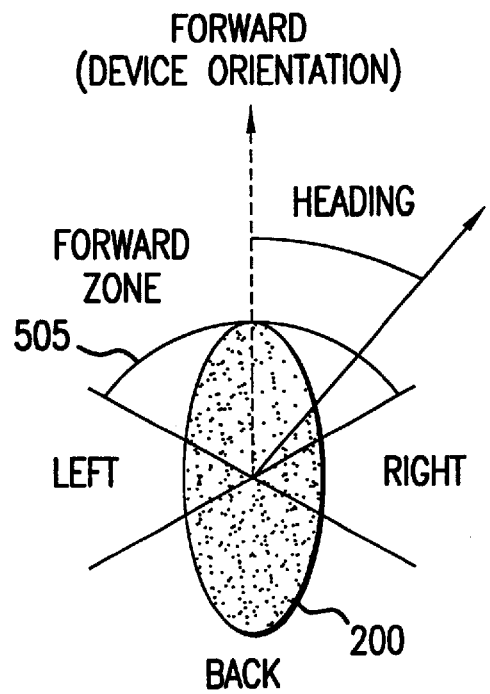
FIG. 10 illustrates an exemplary mapping of navigational directions.

FIG. 10 illustrates that the accuracy of the tactile direction device 200 can be adjusted in accordance with, for example, the topographical characteristics of the location. Specifically, the tactile direction device 200 can be assigned different mappings from the relative direction the tactile direction needs to be oriented in to the particular peg or pegs 275 that should be activated, corresponding to the desired accuracy of the directional cues. For example, the mapping of a forward zone 505 that corresponds to activating the forward peg 275 can be adjusted depending on the type of environment the tactile direction device 200 may be in. If the tactile direction device 200 is in, for example, a complicated shop floor, the forward zone 505 may be narrowed to provide the user with more specificity as to the direction the user should proceed in. Alternatively, if the tactile direction device 200 is located, for example, in a narrow hallway, the forward zone 505 can be widened or relaxed, as illustrated in FIG. 10, so the user can simply navigate around, for example, dog legs in a hallway where minor deviations from the heading ϕ to the next location beacon 405 occur, without receiving new direction cues.

Furthermore, additional criteria may govern whether a relaxed or a narrow mapping of the direction cues may be desired. For example, each time the tactile direction device 200 enters a new zone, corresponding to a new location identifier received from a different location beacon 405, the tactile direction device 200 could map a narrow orientation to the forward zone 505 in the tactile direction device 200 frame of reference. Once the user is oriented and traveling in the direction to reach the next location beacon, the mapping can be relaxed.

For example, if the tactile direction device 200 has entered a new location, it will have received direction information indicating how that location should be traversed in order to reach the next location. In this case, the "forward" direction is mapped to a narrow arc of X degrees centered around the heading direction ϕ to the next location in the global frame of reference. As a consequence of this mapping, the user must orient the tactile direction device 200 within X/2 degrees of the heading angle to the next location in order to obtain a forward direction cue. Alternatively, if the tactile direction device 200 is already in the state of traversing a location and has at some point been oriented in the "forward direction" as described above, the mapping of the forward direction is relaxed to a wide or relaxed arc of Y degrees centered around the heading direction ϕ to the next location in the global frame of reference. As a consequence of this mapping, the user only need orient the device within Y/2 degrees of the heading direction ϕ to the next location in order to obtain a forward cue, where Y>X.

Figure 11:
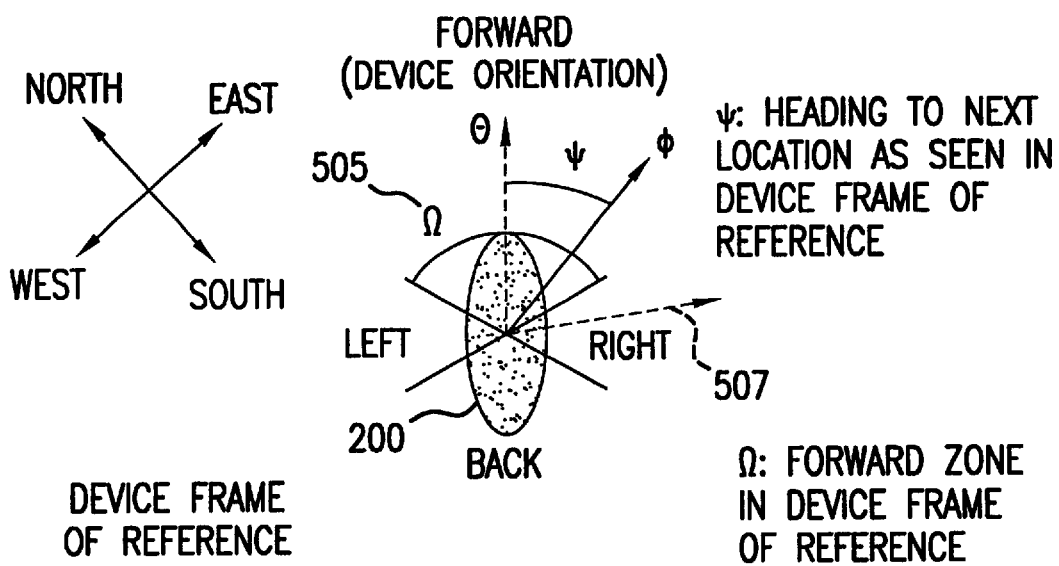
FIG. 11 illustrates an exemplary wide segmentation of a compass rose.

FIG. 11 illustrates how a wide or relaxed mapping is applied by the direction determination circuit 250 of the tactile direction device 200. Specifically, the forward zone 505 Ω is set to Y degrees. Thus, the device frame of reference is relaxed to orient the user within Y/2 degrees of the heading direction ϕ to the next location beacon 405. If the current heading direction θ is within Y/2 degrees of the heading direction ϕ to the next location beacon 405, a revised direction cue does not need to be determined. However, if the current heading direction θ is greater than Y/2 degrees from the heading direction ϕ to the next location beacon 405, as illustrated by current heading direction 507, a revised heading Ψ is needed to align the tactile direction device 200 with the heading direction ϕ to the next location beacon in the global frame of reference. The direction determination circuit 250 then determines a new direction cue to indicate to a user the direction needed to align the tactile direction device 200 with the heading direction ϕ.

Figure 12:
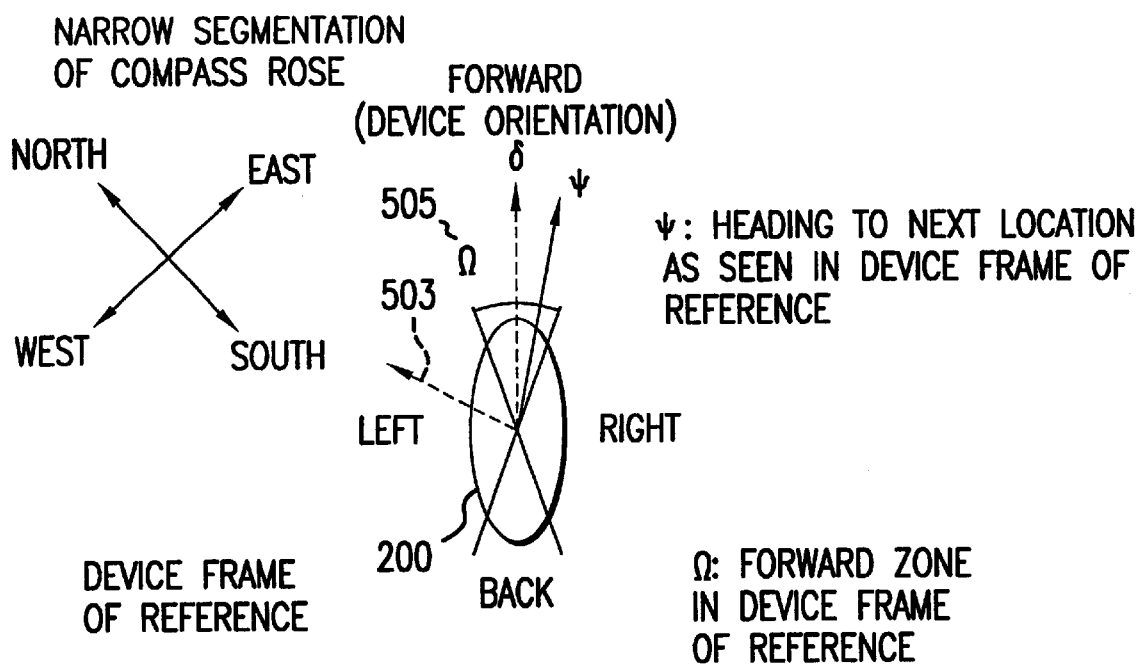
FIG. 12 illustrates an exemplary narrow segmentation of a compass rose.

FIG. 12 illustrates how a narrow mapping is applied to the direction determination circuit 250 of the tactile direction device 200. Specifically, the forward zone 505 Ω is set to X degrees. Thus, the device frame of reference is relaxed to orient the user within X/2 degrees of the heading direction ϕ to the next location beacon 405. If the current heading direction θ is within X/2 degrees of the heading direction ϕ to the next location beacon 405, a revised direction cue does not need to be determined. However, if the current heading direction θ is greater than X/2 degrees from the heading direction ϕ to the next location beacon 405 as illustrated by current heading direction 503, a revised heading Ψ is needed to align the tactile direction device 200 with the heading direction ϕ to the next location beacon in the global frame of reference. The direction determination circuit 250 then determines a new direction cue to indicate to a user the direction needed to align the tactile direction device 200 with the heading direction ϕ.

Figure 13:
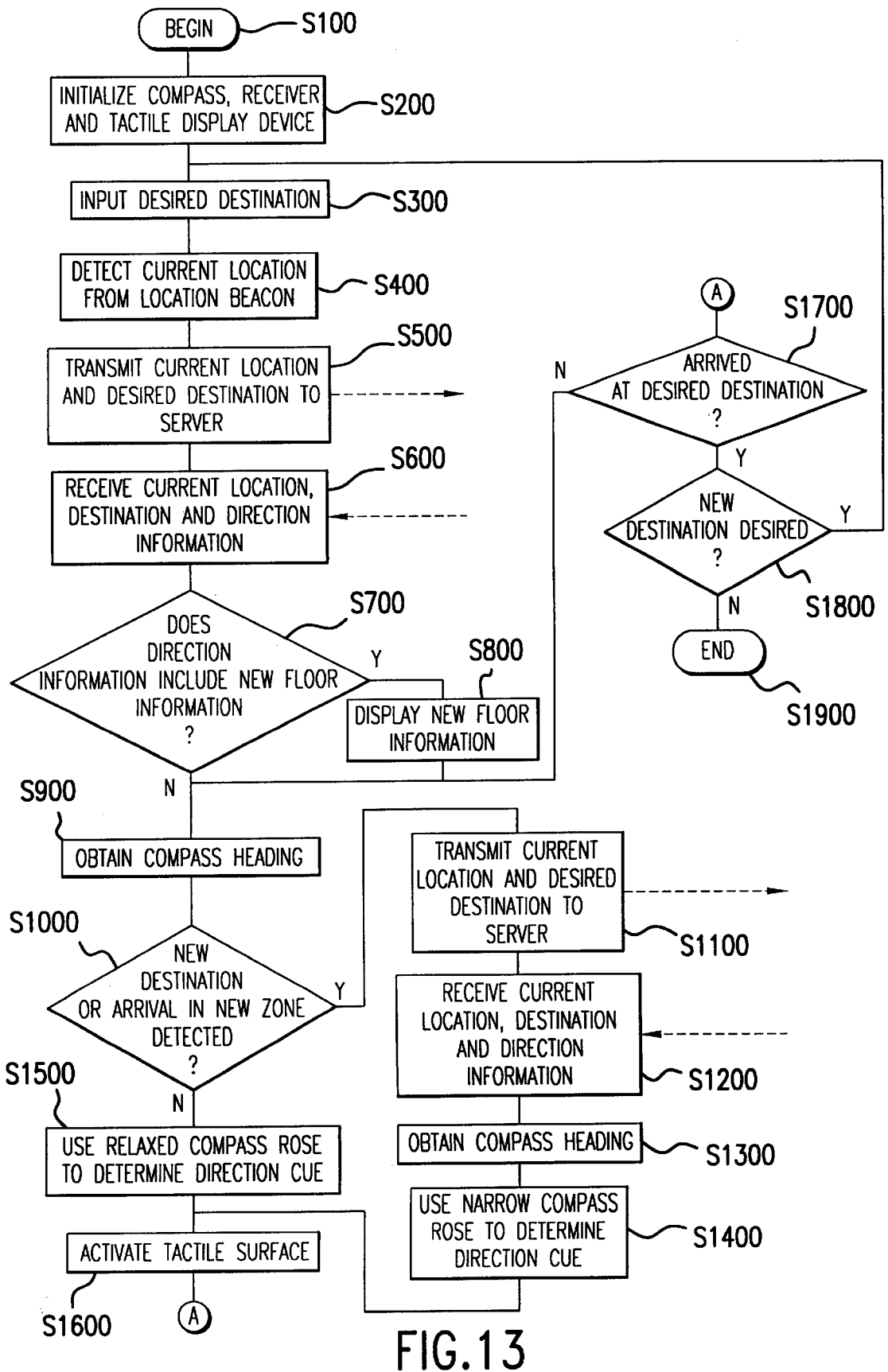
FIG. 13 is a flowchart outlining one embodiment of a method for providing tactile guidance according to this invention.

FIG. 13 is a flowchart outlining one exemplary embodiment of the method for providing tactile guidance using sensory supplementation according to this invention. Control begins in step S100. In step S200, the compass, the receiver and the tactile display device are initialized. Next, in step S300, the desired destination is input. Then, in step S400, the current location is detected from a location beacon. Control then continues to step S500.

In step S500, the current location and the desired destination are transmitted to the guidance server. Next, in step S600, the current location, the desired destination and the direction information to the next in route location are received from the guidance server. Then, in step S700, a determination is made whether the direction information includes new floor information. If the direction information does not include new floor information, control jumps to step S900. Otherwise, control continues directly to step S800. In step S800, the new floor information is displayed, and an optional tone and/or a predetermined cue are activated. Control then continues to step S900.

In step S900, the current heading is obtained from the compass. Next, in step S1000, a determination is made whether a first or new destination has been input, or whether the tactile direction device has arrived in a new zone. If a new or first destination has not been input, or the tactile direction device has not arrived in a new zone, control jumps to step S1500. Otherwise, control continues to step S1100.

In step S1100, the current location and desired destination are transmitted to the server. Next, in step S1200, the current location, desired destination and the direction information are received from the server. Then, in step S1300, a compass heading is obtained. Next, in step S1400, a narrow compass rose is used to determine the direction cue. Control then jumps to step S1600.

In contrast, in step S1500, the relaxed compass rose is used to determine a direction cue. Control then continues to step S1600.

In step S1600, the tactile surface is activated. Next, in step S1700, a determination is made whether the tactile direction device has arrived at the desired destination. If the tactile direction device has not arrived at the desired destination, control jumps back to step S900. Otherwise, control continues to step S1800. In step 1800, a determination is made whether a new destination has been input. If a new destination is has been input, control jumps back to step S300.

Otherwise, control continues to step S1900, where the control sequence ends.

Figure 14:
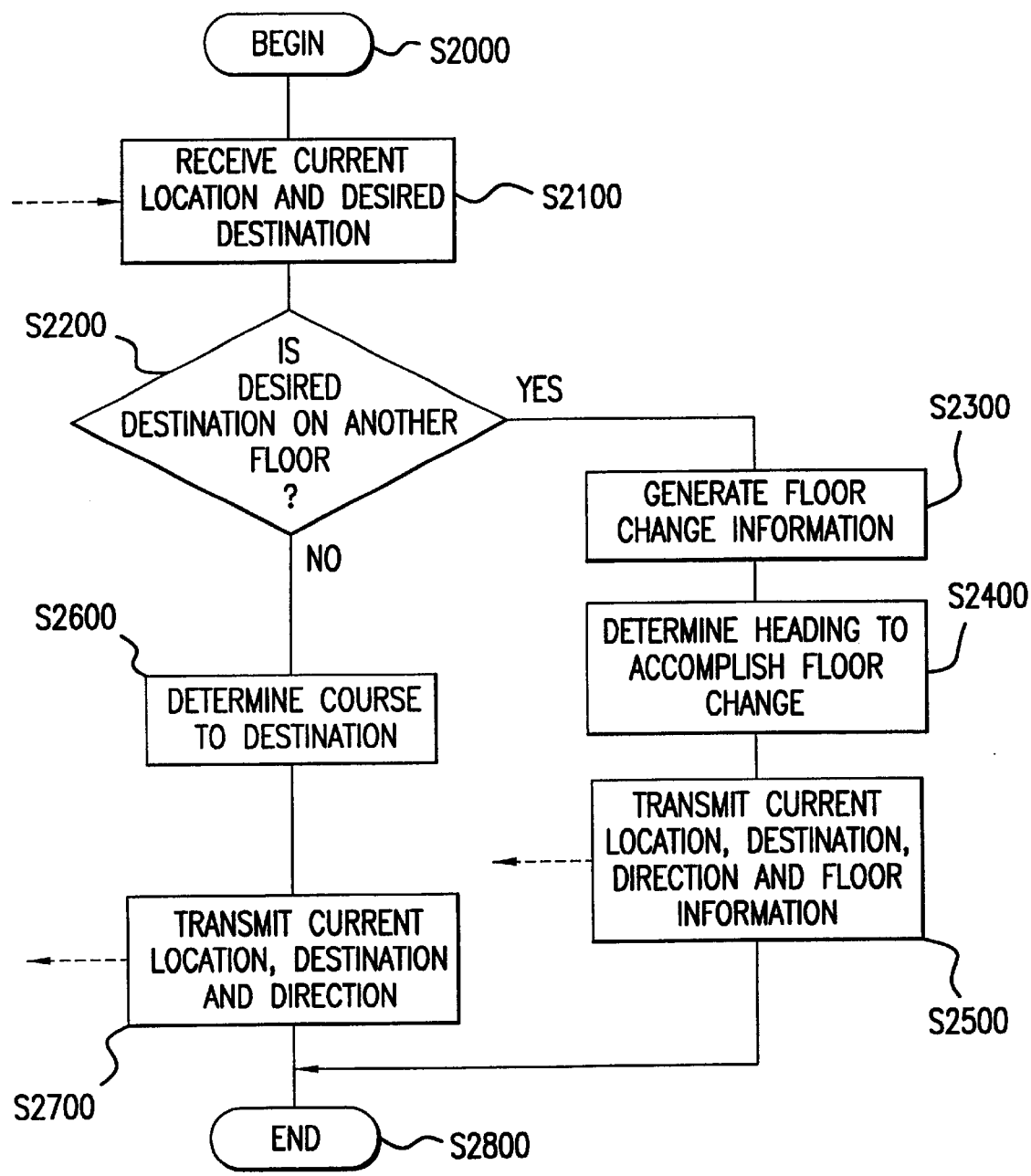
FIG. 14 is a flowchart outlining one method for determining direction information according to this invention.

FIG. 14 is a flowchart outlining one exemplary embodiment for a method for determining the direction information according to this invention. Control begins in step S2000. In step S2100, the current location and the desired destination information are received. Next, in step S2200, a determination is made whether the desired destination is on a different floor than the current location. If the desired destination is on a different floor, control jumps to step S2300. Otherwise, control continues to step S2600.

In step S2300, the floor change information is generated based on the received direction information. Next, in step S2400, heading information to accomplish the floor change is determined. Then, in step S2500, the current location, the desired destination, the direction and the floor information are transmitted to the tactile direction device. Control then jumps to step S2800.

In contrast, in step S2600, the route to the desired destination is determined. Next, in step S2700, the current location, the desired destination and the direction information are transmitted to the tactile direction device. Control then continues to step S2800, where the control sequence ends.

Figure 15:
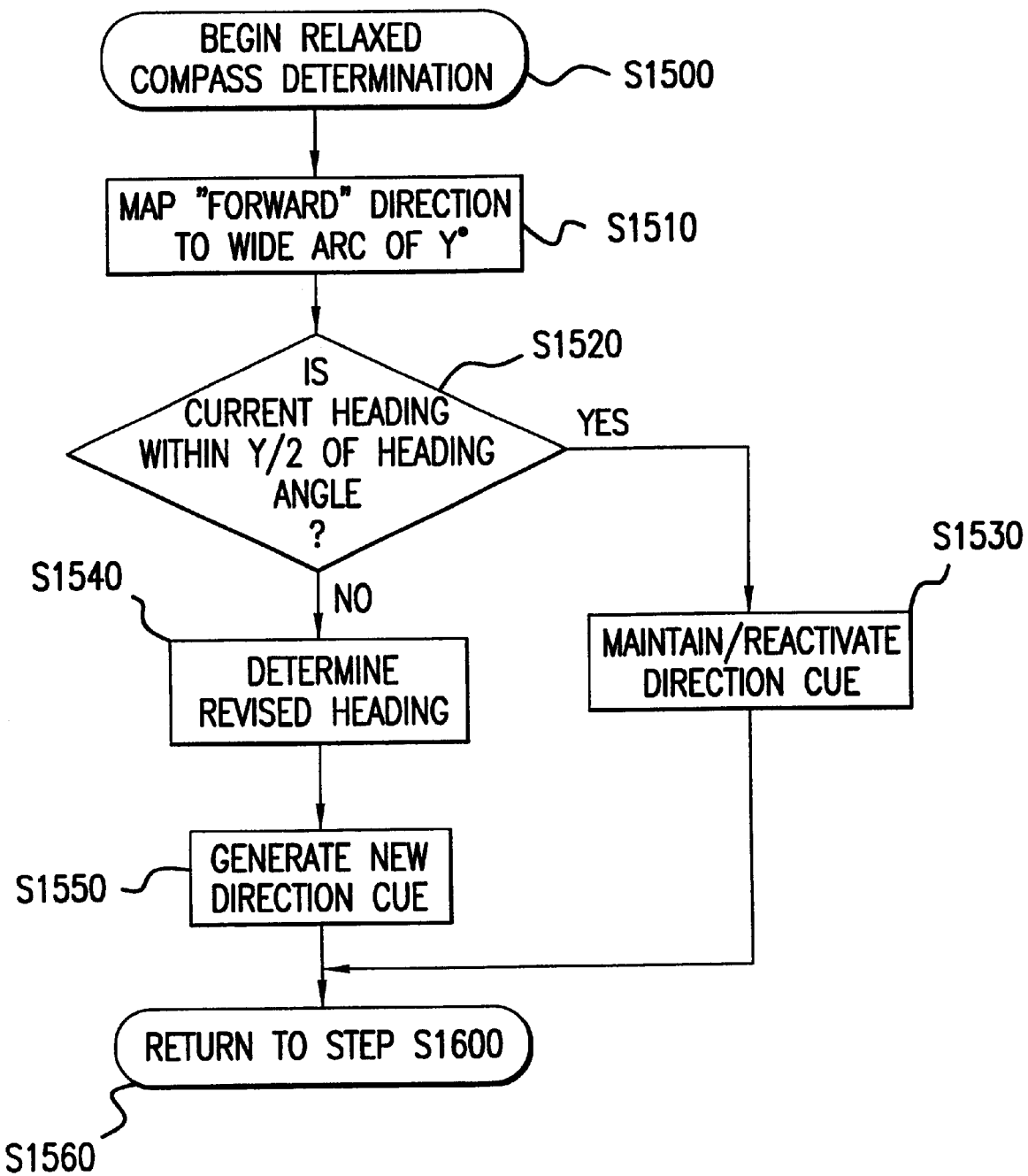
FIG. 15 is a flowchart outlining one exemplary method for using a relaxed compass rose to calculate a direction cue according to this invention.

FIG. 15 is a flowchart outlining in greater detail how the relaxed compass rose is used to determine the direction cue in step S1500. Beginning in step S1500, control continues to step S1510. In step S1510, the "forward" direction is mapped to a wide arc (Y°). Next, in step S1520, a determination is made whether the current heading is within Y/2° of the heading direction $\phi$. If the current heading is within Y/2° of the heading direction $\phi$, control continues to step S1530. Otherwise, control jumps to step S1540.

In step S1530, the current direction cue is maintained or reactivated. Control then jumps to step S1560.

In contrast, in step S1540, the revised heading is determined. Then, in step S1550, a new direction cue is generated. Control then continues to step S1560, where control returns to step S1600.

Figure 16:
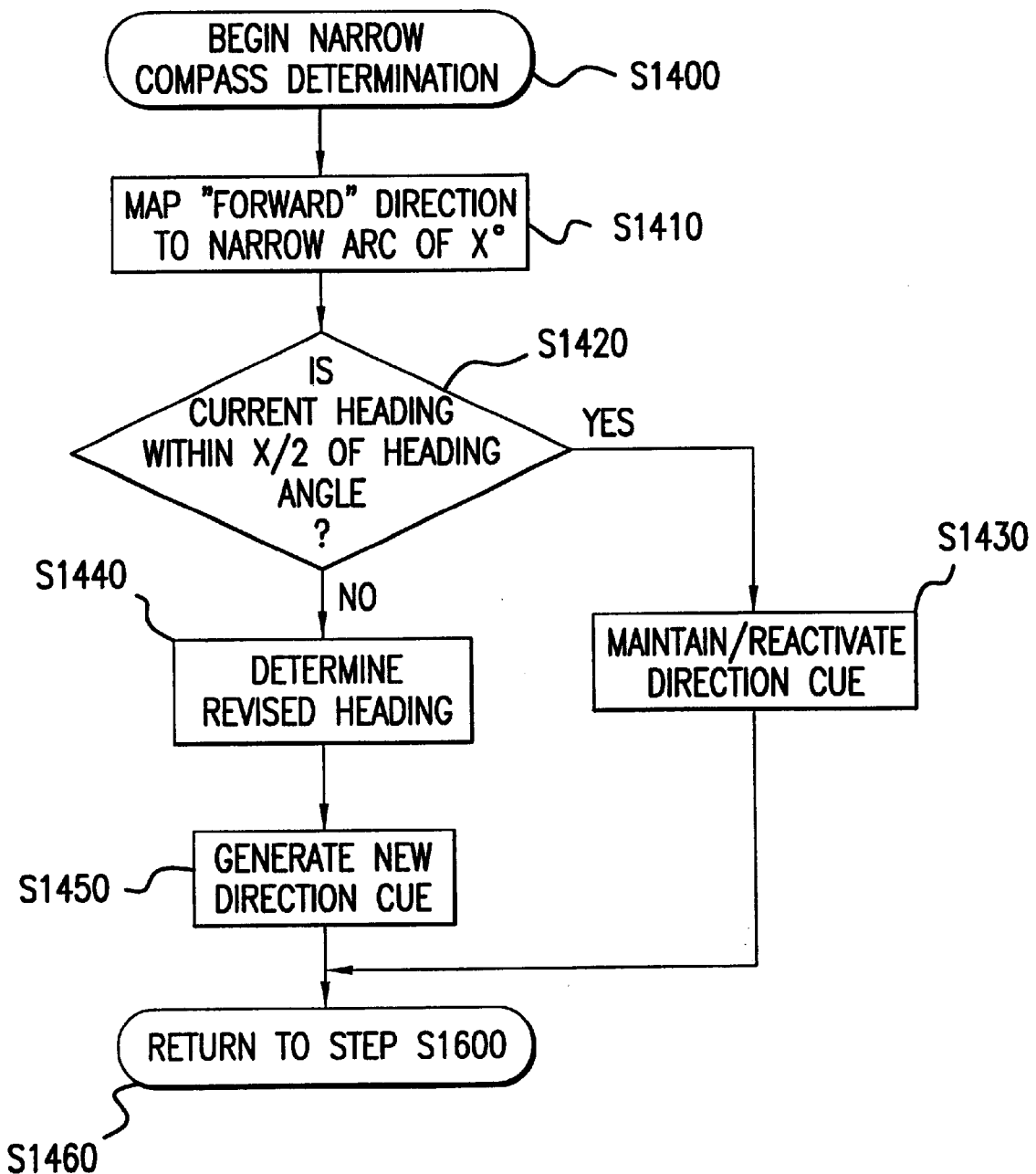
FIG. 16 is a flowchart outlining one exemplary method for using a narrow compass rose to calculate a direction cue according to this invention.

FIG. 16 is a flowchart outlining in greater detail how the narrow compass rose is used to determine the direction cue in step S1400. Beginning in step S1400, control continues to step S1410. In step S1410, the "forward" direction is mapped to a narrow arc (X°). Next, in step S1420, a determination is made whether the current heading is within X/2° of the heading direction $\phi$. If the current heading is within X/2° of the heading direction $\phi$, control continues to step S1430. Otherwise, control jumps to step S1440.

In step S1430, the current direction cue is maintained or reactivated. Control then jumps to step S1460.

In contrast, in step S1440, the revised heading is determined. Then, in step S1450, a new direction cue is generated. Control then continues to step S1460, where control returns to step S1600.

Figure 17:
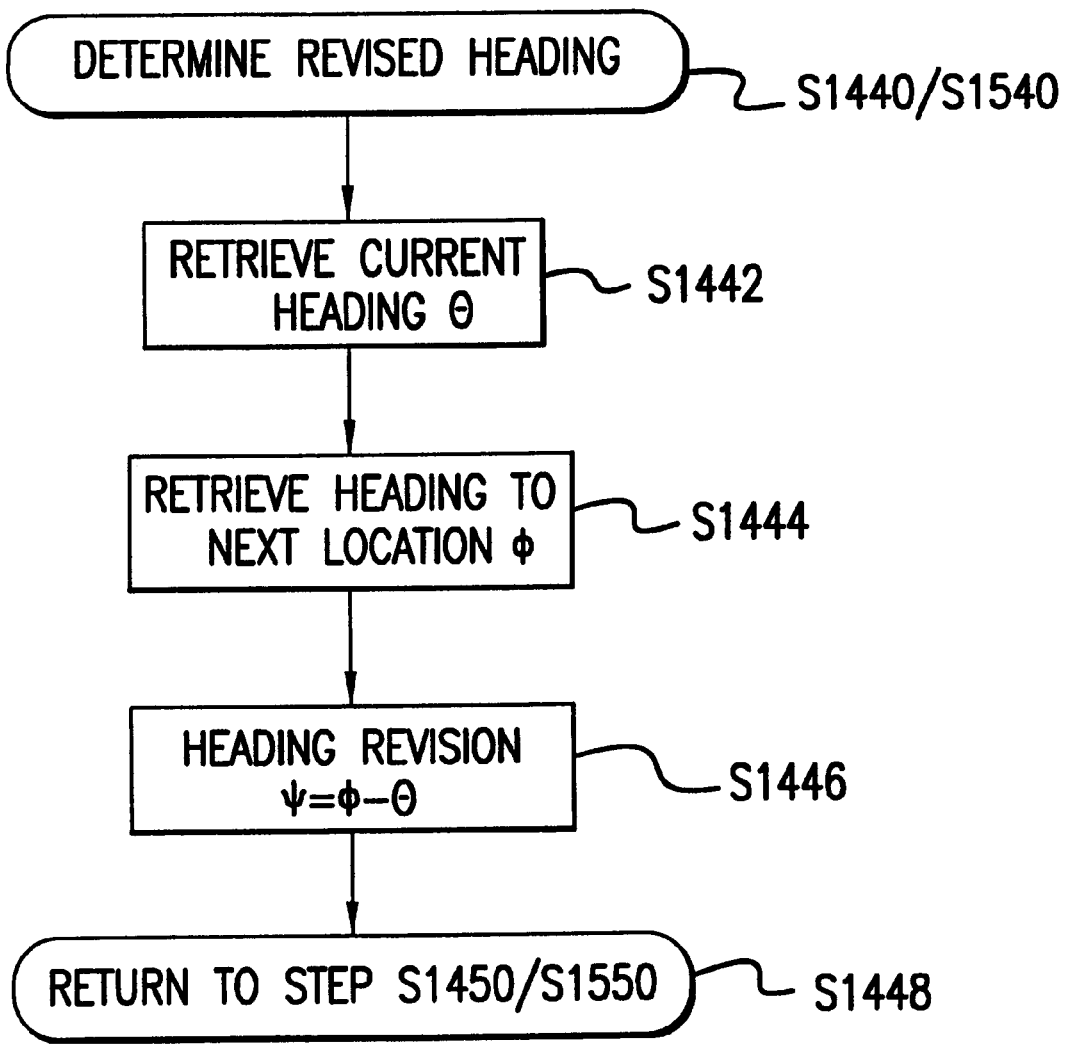
FIG. 17 is a flowchart outlining one method for determining a revised heading according to this invention.

FIG. 17 is flowchart outlining in greater detail the determined revised heading steps S1440 and S1540. In step S1442, the current heading $\theta$ is retrieved. Next, in step S1444, the heading to the next location $\phi$ is retrieved. Then, in step S1446, the heading revision $\Omega$ needed to align the tactile direction device with the heading $\phi$ to the next location beacon is determined. Control then continues to step S1448, where control returns to step S1450 or step S1550 respectively.

As shown in FIGS. 1–4, the tactile direction device 200 is preferably implemented on a programmed general purpose computer. However, the tactile direction device 200 can also be implemented on a special purpose computer, a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, PAL, or the like. In general, in a device capable of implementing a finite state machine that is in turn capable of implementing the flowcharts shown in FIGS. 13 and 15–17 can be used to implement the tactile guidance system.

As shown in FIGS. 1 and 3, the guidance server 300 is preferably implemented on a programmed general purpose computer. However, the guidance server 300 can also be implemented on a special purpose computer, a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, PAL, or the like. In general, in a device capable of implementing a finite state machine that is in turn capable of implementing the flowcharts shown in FIG. 14 can be used to implement the tactile guidance system.

As shown in FIGS. 1 and 5, the location beacon 405 is preferably implemented on an ASIC or other integrated circuit. However, the location beacon 405 can also be implemented on a special purpose computer, programmed general purpose computer, a programmed microprocessor or microcontroller and peripheral integrated circuit elements, a digital signal processor, a hard-wired electronic or logic circuit such as a discrete element circuit, a programmable logic device such as a PLD, PLA, FPGA, PAL, or the like. In general any known or later developed device capable of receiving and/or transmitting information can be used to implement the location beacon 405.

The links 392, 394 and 470 can be a wired or wireless link or any known element that is capable of supplying electronic data to and from the connected elements.

It is, therefore, apparent that there has been provided in accordance with the present invention systems and methods for providing tactile guidance using sensory supplementation. While this invention has been described in conjunction with preferred embodiments thereof, it is evident that many alternatives, modifications and variations be apparent to those skilled in the art. Accordingly, the applicants intend to embrace all such alternatives, modifications and/or variations to follow in the spirit and scope of this invention.

Specifically, it should be apparent to one of ordinary skill in the art that the functions of the guidance server can be incorporated into the tactile direction device. In particular, instead of the guidance server maintaining the look-up table and navigation circuitry for determining the direction needed to arrive either at the desired designation or some intermediary destination, the navigation circuitry can be fully incorporated into the tactile direction device.

Figure 18:
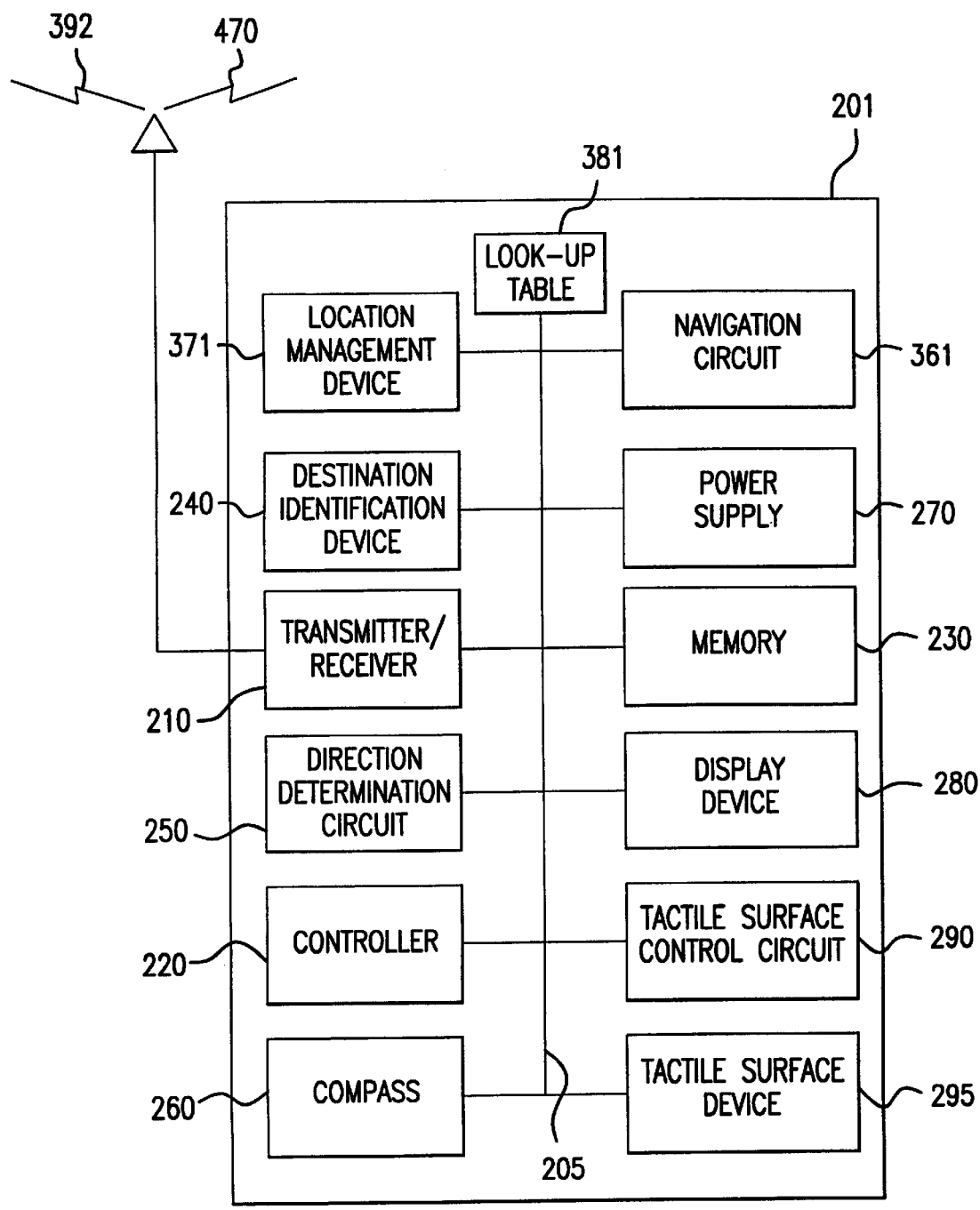
FIG. 18 shows a functional block diagram of a second exemplary embodiment of the tactile direction device according to this invention.

FIG. 18 illustrates such a second exemplary embodiment of the tactile direction device 201. The tactile direction device 201 comprises the transmitter/receiver 210, the controller 220, the memory 230, the destination identification device 240, the direction determination circuit 250, the compass 260, the power supply 270, the display device 280, the tactile surface control circuit 290, the tactile surface device 295 of the first exemplary embodiment shown in FIG. 2, as well as the control/data bus 205 and the antenna 215, a location management device 371, a navigation circuit 361 and a look-up table 381.

In this second exemplary embodiment, the amount of communication between the tactile direction device 201 and the guidance server 300 can be reduced. As described above, in the first embodiment, the tactile direction device 200 receives the desired destination information. This desired destination information and current location are then transmitted to the guidance server 300. The guidance server 300 returns to the tactile direction device 200 only the current location information, the desired destination information and the direction information to direct the user to the next location en route to the final destination.

By incorporating the navigation circuit 360, the location management device 370 and the look-up table 380 of the guidance server 300 into the tactile direction device 201, as the navigation circuit 361, the location management device 371 and the look-up table 381, respectively, communication between the tactile direction device 201 and the guidance server 300 is greatly reduced. Therefore, for this second exemplary embodiment, the guidance server 300 can operate as previously discussed, or the guidance server 300 can simply be a storage location for the look-up table data.

After initialization, where the tactile direction device 201 calibrates the compass 260 and establishes communication with a location beacon 405 in the location beacon network 400 and the guidance server 300, destination identification data is input to the destination identification device 240. This destination identification data corresponds to the desired destination of the user. As previously indicated, the destination identification data can be input to the tactile direction device 201 in any one of a plurality of ways.

Additionally, in parallel with or at any time after initialization, data stored in the look-up table 380 of the guidance server 300 can be downloaded to the look-up table 381 in the tactile direction device 201. Therefore, with reference to the look-up table 381, the navigation circuit 361 can determine the direction needed to route the user to an interim destination that is in route to the final destination.

For example, while riding on a train in a subway system, a user arrives at a subway station where the user must switch to a new train. Upon disembarking from the train, data stored in the look-up table 380 is automatically transferred to the look-up table 381. The user could then approach a subway attendant and inquire as to the platform for the train to "Oxford Street." Upon receiving this request, the attendant could activate a transmitter that forwards destination identification data corresponding to "Oxford Street" to the tactile direction device 201.

Alternatively, for example, upon entering a new environment, the user could proceed to a direction kiosk. This kiosk could, for example, show a map of the environment, such as, for example, a nature park, that the user is in. Upon selecting the desired destination at the kiosk, the kiosk could transfer the destination identification data as well as the data stored in the look-up table 380 to the tactile direction device 201.

Upon receipt by the tactile direction device 201, the destination identification data is transferred via the antenna 215 and the transmitter/receiver 210 to the memory 230 at the direction of the controller 220. Additionally, the look-up table data is transferred via the antenna 215 and the transmitter/receiver 210 to the look-up table 381 also at the direction of the controller 220. The destination identification device 240 and the navigation circuit 361 can then retrieve the destination identification data and look-up table data from the memory 230 and the look-up table 381, respectively, as needed.

Upon receiving the destination identification data and look-up table data, the tactile direction device 201 detects its current location based on a signal received over the wireless link 470 from a location beacon 405 in the location beacon network 400. This current location information is received over the antenna 215 and the transmitter/receiver 210 and stored under control of the controller 220 in the memory 230 over the control/data bus 205. At the direction of the controller 220, the current location is retrieved from the memory 230. Furthermore, at the direction of the controller 220, the destination identification data corresponding to a desired destination is retrieved from the 230 and both the current location and desired destination are forwarded to the navigation circuit 361.

The navigation circuit 361 returns the direction information to the direction determination circuit 250 for storage in memory 230. The direction determination circuit 250 then determines whether new floor information was included with the direction information returned from the navigation circuit 361. If new floor information was included, the direction determination circuit 250 retrieves the new floor information from the 230. Under the control of the controller 220, the new floor information is displayed on display device 280. This allows a user to recognize that the user must traverse to a new floor to reach the desired destination.

Alternatively, if no new floor information was received from navigation circuit 361, or after the new floor information is displayed, the tactile direction device 201 obtains a current heading from the compass 260. Once a current compass heading is obtained from the compass 260, the direction determination circuit 250 retrieves from the memory 230 the direction information received from the navigation circuit 361 and determines a direction cue. The direction cue is then forwarded to the tactile surface control circuit 290, which activates at least one actuator in the tactile surface device 295. The actuator indicates to a user the direction in which to proceed to reach the desired destination.

The first exemplary embodiment describes systems and methods where the current location information, the desired destination information and the direction information are communicated between the tactile direction device and the guidance server 300. By duplicating the data stored in the look-up table 380 into the look-up table 381 of the tactile direction device 200, communication between tactile direction device 200 and the guidance server 300 can be reduced. Instead of communication between the tactile guidance device 200 and the guidance server 300 occurring each time updated direction information is requested from the tactile direction device 200, communication between the tactile direction device 201 and the guidance server 300 need occur only once. During this communication, for example, during initialization, the guidance server 300 will transfer all the data in look-up table 380 to the tactile direction device 201. Therefore, since the tactile direction device 201 includes the navigation circuit 361 and the location management device 371, the tactile direction device 201 is capable of determining the direction information without any further communication with the guidance server 300.

This initial download technique could prove beneficial in "noisy" environments. For example, on an industrial shop floor where radio-frequency interference is common, transmitting of the data stored in look-up table 380 from the guidance server 300 to the tactile direction device 201 at a particular "tactile direction device download station" could insure that the interference does not effect navigation on the shop floor. Additionally, in an environment such as a mine, communication between the tactile direction device 201 and the guidance server 300 may not be easily implemented. Therefore, downloading all or a portion of the data from the look-up table 380 to the tactile direction device 201 eliminates potential communication difficulties between the two devices.

Accordingly, it should be appreciated, that the methods disclosed in FIGS. 13–17 could be modified to accommodate a tactile direction device 201 that includes the navigation circuit 361, location management device 371 and look-up table 381. Once a set of data has been downloaded and stored in the look-up table 381, operation is quite similar to that discussed in relation to the embodiment where the tactile direction device and guidance server are separate devices. However, instead of the tactile direction device needing to communicate with the guidance server each time direction information is needed, the direction information can be determined internally to the tactile direction device 201.

Furthermore, it should be appreciated that the location beacon need not actually be an active beacon, i.e., a transmitter, in the traditional sense. That is, in contrast to the location beacons 405 described above, the location beacon can be a passive identification carrying device such as a label containing a bar code or a color code. For example, as a user passes such an identification carrying device, the user places the tactile direction device 200 or 201 within the sensible area of the location identifier to provide the tactile direction device 200 or 201 with the current location information.

Figure 19:
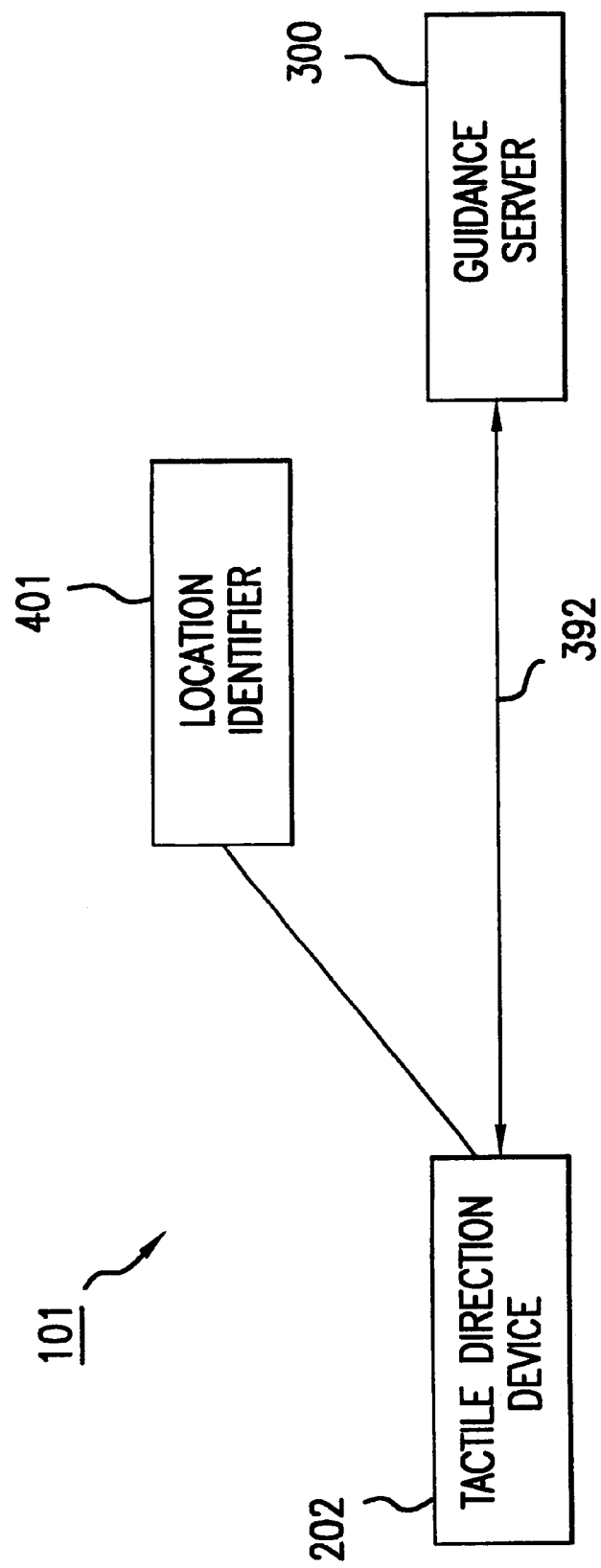
FIG. 19 is a functional block diagram showing a second exemplary embodiment of the tactile guidance system according to this invention.

FIG. 19 illustrates a second exemplary tactile guidance system 101 according to this invention. Specifically, the tactile guidance system 101 comprises a tactile direction device 202, a guidance server 300, a plurality of location identifiers and a wireless link 392.

The tactile direction device 202 and guidance server 300 operate as previously discussed. However, the location identifier 401 passively identifies the current location of a user. As a user navigates through an environment, the user places the tactile direction device 202 into the sensible area of the location identifier 401. As the tactile direction device 202 is placed in the sensible area of the location identifier 401, the tactile direction device reads the current location information contained in the location identifier 401.

For example, the location identifier 401 could be a bar code, a color code, a magnetic strip, an inductive or capacitive device, an optically readable device, or any other known or later developed device that is capable of passively identifying a location. In general, a location identifier 401 can be anything that is capable of storing a readable location identifier.

Figure 20:
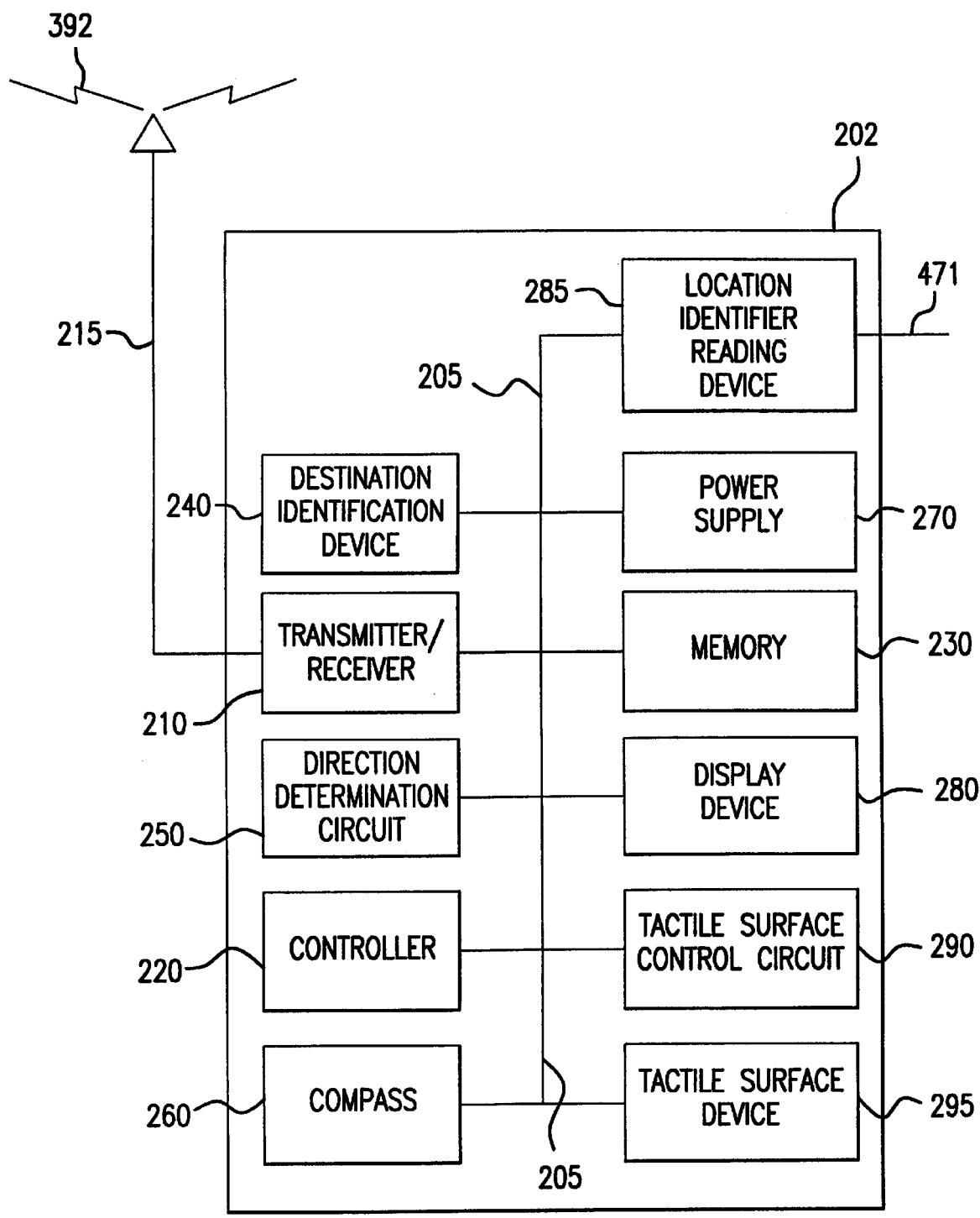
FIG. 20 shows a functional block diagram of a third exemplary embodiment of the tactile direction device according to this invention.

FIG. 20 illustrates one exemplary embodiment of the tactile direction device 202 that has been adapted to read the passive location identifiers 401. Specifically, the tactile direction device 202 comprises the transmitter/receiver 210, the controller 220, the memory 230, the destination identification device 240, the direction determination circuit 250, the compass 260, the power supply 270, the display device 280, the tactile surface control circuit 290, the tactile surface device 295, the control/data bus 205, and an antenna 215, as well as a location identifier reader 285.

The location identifier reader 285 replaces the transmitter/receiver 210 and the wireless link 470 for the purposes of obtaining the current location of a user. For example, if the location identifier 401 is a bar code, the location identifier reader 285 is a bar code scanner.

Thus, in operation, as a user is traversing an environment, the user associates the tactile direction device 201 with the location identifier 401 in a manner such that the location identifier reading device 285 is capable of reading the current location information from the location identifier 401.

As previously discussed, this embodiment may be helpful in environments where radio or optical communication is difficult, or where it is an economical or physically difficult to install radio-frequency or optically emitting active location beacons, such as in an old building.

It should be appreciated that the location identifier reading device 285 and the location identifier 401 are not limited to a bar code scanner and a bar code, respectively. That is, the location identifier 401 can be a device such as a microchip or other device capable of carrying information based on its mechanical, electrical or magnetic properties. For example, the location identifier 401 could maintain or respond to an electric or magnetic field. The location identifier 401 would then produce an electromagnetic field into which the location identifier reading device 285 can be placed. When the location identifier reading device 285 is placed in the sensible area of the location identifier 401, the location identifier reading device 285 becomes capacitively, inductively, or otherwise electromagnetically coupled to the location identifier 401 and the information can be extracted from the location identifier 401 by the location identifier reading device 285.

Accordingly, it should be appreciated, that the methods disclosed in FIGS. 13–17 could be modified to accommodate passive location identifiers. In particular, instead of receiving a current location from a location beacon, a user would be required to positively interact with the location identifier 401 by ensuring that the tactile direction device 201 is placed into the sensible area of the location identifier 401. Once the current location that is obtained from the location identifier 401, control would continue as previously described until a new location identifier is encountered. Then, again, the user would positively interact with the location identifier 401 to ensure that location identifier reading device 285 reads the updated current location.

Furthermore, it should be appreciated that any combination of active location beacons, passive location identifiers, "one-time" communication operation between the tactile direction device 201 and the guidance server 300 or multiple communication operation between the tactile direction device 200 or 201 and the guidance server 300 can be formed.

While this invention has been described in conjunction with preferred embodiments thereof, it is evident that many alternatives, modifications and variations be apparent to those skilled in the art.

What is claimed is:

1. A system that provides navigational assistance to a user comprising:

a location identifier that provides a current location information within a building, area or geographic locale;

a direction determiner circuit that determines a direction information based on a current heading, the current location information and a desired destination; and a tactile direction device that provides a non-focal direction cue to a user based on the determined direction information.

2. The system of claim 1, further comprising:

a tactile surface control circuit that translates the determined direction information into a control signal; and a tactile surface that responds to the control signal to provide the non-focal direction cue to the user.

3. The system of claim 2, wherein the tactile surface comprises at least one movable peg, movement of the at least one movable peg corresponding to the determined direction information.

4. The system of claim 1, wherein the direction determiner circuit selects a compass rose segmentation map based on at least one of the current location information and the desired destination.

5. The system of claim 1, further comprising a destination identification device that performs at least one of managing data corresponding to the desired destination, converting the desired destination into a user recognizable mnemonic, and storing of the desired destination.

6. The system of claim 1, wherein the direction determiner circuit further determines whether traversing to a different floor is required to reach the desired destination, and updates the direction information to direct the user to a location to accomplish the floor change.

7. The system of claim 1, further comprising a notification device that alerts the user when traversing to a different floor is required to reach the desired destination.

8. The system of claim 7, wherein the tactile direction devices acts as the notification device.

9. The system of claim 1, further comprising a database that stores at least one direction information preference, the direction information preference pointing to a particular look-up table based on the user's needs.

10. The system of claim 9, wherein the database is located in the tactile direction device.

11. The system of claim 9, wherein the database is located in a guidance server.

12. The system of claim 11, further comprising a communication link, the communication link enabling communication between the guidance server and the direction determiner circuit.

13. The system of claim 1, further comprising a database that stores at least one look-up table, the look-up table providing a correlation between the current location information and the desired destination information.

14. The system of claim 13, wherein the database is located in the direction determiner circuit.

15. The system of claim 13, wherein the database is located in a guidance server.

16. The system of claim 15, further comprising a communication link, the communication link enabling communication between the guidance server and the direction determiner circuit.

17. The system of claim 1, wherein the location identifier is at least one of an electromagnetic signal transmitter, a bar code, a color code, or an infra-red emitter.

18. The system of claim 1, wherein a portion of the direction information is determined by a guidance server, the guidance server determining a direction to reach a next location.

19. The system of claim 1, wherein the direction determiner circuit is integrated with the tactile direction device into a single device.

20. The system of claim 1, wherein the tactile direction device is a hand-held device.

21. A method of providing navigational assistance to a user comprising:
   identifying a current location information within a building, area or geographic location;
   determining a direction information based on the current location information, a current heading and a destination information; and
   providing a non-focal direction cue to a user based on the determined direction information.

22. The method of claim 21, wherein providing the non-focal direction cue comprises activating a tactile surface based on the determined direction information to provide the non-focal direction cue to the user.

23. The method of claim 22, wherein activating the tactile surface comprises moving at least one movable peg corresponding to the determined direction information.

24. The method of claim 21, wherein providing the non-focal direction cue comprises:
   selecting a compass rose segment map; and
   converting the direction information to the non-focal direction cue based on the selected compass rose segmentation map.

25. The method of claim 21, further comprising notifying the user when traversing to a different floor is required.

26. The method of claim 25, wherein the notification is at least one of an audio cue, a visual cue or a tactile cue.

27. The method of claim 21, further comprising translating at least one of the destination information or the current location information into a readable mnemonic.

28. The method of claim 21, further comprising establishing a communication link between a tactile guidance device and a guidance server.

29. The method of claim 28, further comprising accessing a database, the database storing at least one direction information preference, the direction information preference pointing to a particular look-up table based on the user's needs.

30. The method of claim 29, wherein the database is located in the tactile direction device.

31. The method of claim 29, wherein the database is located in the guidance server.

32. The method of claim 28, further comprising accessing a database, the database storing at least one look-up table, the look-up table providing a correlation between the current location information and the desired destination information.

33. The method of claim 32, wherein the database is located in the tactile direction device.

34. The method of claim 32, wherein the database is located in the guidance server.

35. A tactile direction device that provides navigational assistance to a user through direction cues comprising:
   a direction determination circuit that determines a direction cue based on a current location within a building area or geographic area, a direction information and a current heading;
   a tactile surface control circuit that translates the direction cue into a control signal; and
   a tactile surface device that provides a non-focal direction cue to a user based on the control signal.

36. The device of claim 35, further comprising a navigation circuit that determines the direction information based on a current location and a desired destination.

37. The device of claim 36, further comprising a destination identification device that performs at least one of managing a data corresponding to the desired destination, converting the data into a user recognizable mnemonic, and storing the data.

38. The device of claim 35, further comprising a compass that provides the current heading.

39. The device of claim 35, wherein the tactile surface device comprises an array of movable pegs that transfers the non-focal direction cue to the user.

40. The device of claim 35, wherein the direction determination circuit further determines whether traversing to a different floor is required to reach the desired destination.

41. The device of claim 35, further comprising a notification device that alerts the user when traversing to a different floor is required to reach a desired destination.

42. The device of claim 41, wherein the notification device is a tactile surface.

43. The device of claim 35, further comprising a transmitter/receiver, the transmitter/receiver allowing communication between the tactile direction device and a guidance server, the guidance server providing the direction information to the tactile direction device based on a current location and a desired destination.

44. The device of claim 35, further comprising a database that stores at least one direction information preference, the direction information preference pointing to a particular look-up table based on the user's needs.

45. The device of claim 44, wherein the database is located in the tactile direction device.

46. The device of claim 44, wherein the database is located in a guidance server.

47. The device of claim 46, further comprising a communication link, the communication link enabling communication between the guidance server and the tactile direction device.

48. The device of claim 35, further comprising a database that stores at least one of a look-up table, the look-up table providing a correlation between the current location information and the desired destination information.

49. The device of claim 48, wherein the database is located in the tactile direction device.

50. The device of claim 48, wherein the database is located in a guidance server.

51. The device of claim 50, further comprising a communication link, the communication link enabling communication between the guidance server and the tactile direction device.

52. The device of claim 35, wherein the tactile direction device is at least one of a hand-held device, a device embedded into a briefcase, a device embedded into a purse, a device embedded into a shoe, a device embedded into a hat, a device embedded into a wheelchair, or a device embedded into a wearable object.

53. The device of claim 35, further comprising a power supply which allows the tactile direction device to be self-contained.

54. A method of providing navigational assistance to a user through a tactile direction device comprising:
   determining a direction cue based on a location base within a building area or geographic locale, a direction information and a current heading; and
   translating the direction cue into a control signal; and
   activating a tactile surface device that responds to the control signal and provides a non-focal direction cue to a user.

55. The method of claim 54, further comprising determining the direction information based on a current location and a destination identification data.

56. The method of claim 54, further comprising receiving the direction information from a guidance server, the guidance server determining the direction information based on a current location and a desired destination.

57. The method of claim 54, further comprising accessing a database, the database storing at least one direction information preference, the direction information preference pointing to a particular look-up table based on the user's needs.

58. The method of claim 57, wherein the database is located in the tactile direction device.

59. The method of claim 57, wherein the database is located in the guidance server.

60. The method of claim 59, further comprising establishing a communication link between a tactile guidance device and a guidance server.

61. The method of claim 54, further comprising accessing a database, the database storing at least one look-up table, the look-up table providing a correlation between the current location information and the desired destination information.

62. The method of claim 61, wherein the database is located in the tactile direction device.

63. The method of claim 61, wherein the database is located in the guidance server.

64. The method of claim 63, further comprising establishing a communication link between a tactile guidance device and a guidance server.

65. The method of claim 54, further comprising performing at least one of managing a data corresponding to the desired destination, converting the data into a user recognizable mnemonic, and storing the data.

66. The method of claim 54, further comprising retrieving a compass heading as the current heading.

67. The method of claim 54, further comprising controlling an array of movable pegs in the tactile surface device that transfers the non-focal direction cue to the user.

68. The method of claim 54, further comprising determining whether traversing to a different floor is required to reach a desired destination.

69. The method of claim 68, further comprising alerting the user when traversing to a different floor is required to reach a desired destination.

* * * * *